(12) United States Patent
Hatanaka

(10) Patent No.: US 8,690,323 B2
(45) Date of Patent: Apr. 8, 2014

(54) METHOD OF SELECTING LENS DESIGN STANDARD

(75) Inventor: Takashi Hatanaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 227 days.

(21) Appl. No.: 12/989,989

(22) PCT Filed: Apr. 28, 2009

(86) PCT No.: PCT/JP2009/058351
§ 371 (c)(1),
(2), (4) Date: Oct. 28, 2010

(87) PCT Pub. No.: WO2009/133887
PCT Pub. Date: Nov. 5, 2009

(65) Prior Publication Data
US 2011/0043754 A1    Feb. 24, 2011

(30) Foreign Application Priority Data

Apr. 28, 2008    (JP) ................................ 2008-117444

(51) Int. Cl.
*G02C 7/00*    (2006.01)
(52) U.S. Cl.
USPC .................................................. 351/159.75
(58) Field of Classification Search
USPC .................................................. 359/159.75
See application file for complete search history.

(56) References Cited

U.S. PATENT DOCUMENTS

| | | | | |
|---|---|---|---|---|
| 5,691,799 A | * | 11/1997 | Ramachandran | ............ 351/204 |
| 5,861,935 A | * | 1/1999 | Morris et al. | ............ 351/159.42 |
| 5,926,247 A | * | 7/1999 | Kimura | ............ 351/41 |
| 6,193,370 B1 | | 2/2001 | Shirayanagi | |
| 6,199,983 B1 | | 3/2001 | Kato et al. | |
| 6,637,880 B1 | * | 10/2003 | Yamakaji et al. | ......... 351/159.75 |
| 7,637,614 B2 | * | 12/2009 | Berthezene et al. | ...... 351/159.42 |
| 8,210,679 B2 | * | 7/2012 | Varnas et al. | ............ 351/159.42 |

FOREIGN PATENT DOCUMENTS

| | | |
|---|---|---|
| JP | 3 206417 | 9/1991 |
| JP | 6 63015 | 3/1994 |
| JP | 10 115808 | 5/1998 |
| WO | WO 97/38343 A1 | 10/1997 |

(Continued)

OTHER PUBLICATIONS

Federal Register vol. 76, No. 27; Feb. 2011; pp. 7162-7175.*

(Continued)

*Primary Examiner* — Zachary Wilkes
(74) *Attorney, Agent, or Firm* — Oblon, Spivak, McClelland, Maier & Neustadt, L.L.P.

(57) ABSTRACT

A method includes preparing design variations, which include a plurality of basic design distribution groups different from each other in area-division between a distance vision area and a near vision area, and a plurality of corridor lengths different from each other. Parameters originating from prescription information, life environmental information, frame shape information and the like are input. A basic design distribution group and a corridor length are selected based on the aforesaid information. A lens design standard is obtained based on the selected basic design distribution group and corridor length. As parameters, a distance between a vertex of a rear surface of a right progressive addition lens and a vertex of a cornea of a right eye and a distance between a vertex of a rear surface of a left progressive addition lens and a vertex of a cornea of a left eye are included in setting elements.

10 Claims, 6 Drawing Sheets

(56) References Cited

FOREIGN PATENT DOCUMENTS

| | | |
|---|---|---|
| WO | 98 16862 | 4/1998 |
| WO | WO 03/052491 A1 | 6/2003 |
| WO | WO 2004/046792 A1 | 6/2004 |
| WO | WO 2006/116820 A1 | 11/2006 |
| WO | WO 2007/019938 A1 | 2/2007 |

OTHER PUBLICATIONS

International Search Report issued Jul. 14, 2009 in PCT/JP09/58351 filed Apr. 28, 2009.

Extended European Search Report issued Sep. 4, 2013, in Patent Application No. 09738824.3.

\* cited by examiner

METHOD OF SELECTING LENS DESIGN STANDARD

TECHNICAL FIELD

The present invention relates to a method for selecting a lens design standard by selecting a basic design distribution and a corridor length of a progressive addition lens pair to obtain a lens design standard.

BACKGROUND ART

Nowadays a great variety of progressive addition lenses are designed and marketed by a great number of spectacle lens manufacturers. Among these progressive addition lenses, balance type progressive addition lenses with so-called "balance type design" are most highly demanded, and therefore widely sold and widely used. Such balance type progressive addition lenses are designed so as to have a wide distance vision area, and an intermediate-to-near vision area wide enough for general use. Most of the balance type progressive addition lenses marketed by the great number of spectacle lens manufacturers are designed so as to be able to be easily worn by any user in any situation.

However, even with the progressive addition lens with balance type design, there are still many cases where the user is dissatisfied with the vision that he (or she) has seen through the lenses of the completed spectacles. First, the content of the dissatisfaction with the progressive addition lens with balance type design includes dissatisfaction with the width of the clearly viewable vision when viewing distant objects and the width of the clearly viewable vision when viewing near objects through the lens.

On the other hand, due to progressive change of the power from the distance vision area to the near vision area of the progressive addition lens, distortion and blurring of image in the lateral portion ranging from the intermediate vision area to the near vision area of the lens are caused. Due to the distortion and blurring, when fluctuation of image caused while the user moves his (or her) line-of-sight becomes large, the user will be dissatisfied with unnatural vision he (or she) has seen caused by the fluctuation of image. It is known that the aforesaid two dissatisfactions are the main dissatisfactions when using the progressive addition lens.

The aforesaid two dissatisfactions are antithetical to each other, and it is impossible to reduce the two dissatisfactions at the same time. For example, the relation of the two dissatisfactions is: if trying to design a progressive addition lens to further widen the clearly viewable vision when viewing distant objects and the clearly viewable vision when viewing near objects through the lens, the distortion and blurring of image in the lateral portion and the fluctuation of image caused while the user moves his (or her) line-of-sight will become larger. Thus, it is impossible to reduce the two dissatisfactions at the same time. Further, even if the user does not particularly express dissatisfaction, it does not necessarily mean that the user is quite satisfied with the progressive addition lens.

Although there are progressive addition lenses exclusively designed to meet the specific use requirements such as reading, doing desk work, operating personal computer, playing sports (such as golf and tennis) and the like, these progressive addition lenses have defects when being used for other purposes than the use requirements they are designed to meet. For example, a progressive addition lens for the purpose of reading and desk work is designed to have a wider near vision area. Thus, the distortion and blurring of image in the lateral portion ranging from the intermediate vision area to the near vision area of the lens are increased, and the fluctuation of image caused when the user moves his (or her) line-of-sight is increased. Further, since the clearly viewable vision of the distance vision area is narrow, it will be inconvenient to use the spectacles with such progressive addition lenses when going outside, although it can be comfortably used to read and do desk work in the room. In other words, since the distance vision area of the lens is narrow, it is difficult to have a wide view of distant objects. Further, as described above, since the distortion and blurring of image in the lateral portion ranging from the intermediate vision area to the near vision area of the lens and the fluctuation of image caused when the user moves his (or her) line-of-sight are large, the distortion, blurring and fluctuation of image will become serious especially when the user is moving.

While a progressive addition lens for the purpose of playing outdoor sports such as golf, tennis and the like is designed to have a wider distance vision area, so that the distortion and blurring of image in the lateral portion ranging from the intermediate vision area to the near vision area of the lens and the fluctuation of image caused when the user moves his (or her) line-of-sight are reduced. The clearly viewable vision ranging from the intermediate vision area to the near vision area is narrowed, so that such progressive addition lens can be comfortably used when playing outdoor sports. On the other hand, the defect of the spectacles with such progressive addition lenses is that the near vision area is narrow when using such spectacles to read books and newspapers, or do desk work.

As described above, the progressive addition lens exclusively designed to meet the specific use requirements is difficult to be used for wide purposes, and therefore such lens is used for alternative uses.

On the other hand, unlike the progressive addition lens exclusively designed to meet the specific use requirements such as reading, doing desk work, operating personal computer, and playing sports (such as golf and tennis and the like), the aforesaid progressive addition lens with balance type design is limited in its performance for each individual use, and is inferior to the exclusively designed progressive addition lens in each individual use. However, the balance type lens is a progressive addition lens capable of being used somewhat comfortably for wide purposes, and is widely demanded and widely sold. Thus, the issue for the lens manufacturers is to relieve dissatisfactions of each individual user with the balance type progressive addition lens as much as possible, and develop a balance type progressive addition lens satisfied by the user more than ever before.

To tackle this issue, there is disclosed a technique for providing a progressive addition lens with a design most suitable for each individual user from a plurality of previously prepared progressive addition lenses with different designs (see Patent Document 1).

This technique is developed to select a lens for each individual user from a plurality of progressive addition lens types based on information such as user's age and wearing environment so that the selected lens is most suitable for the user, wherein the plurality of progressive addition lens types are each previously assigned to evaluation data such as user's age and suitability for his (or her) career and hobby (as wearing environment and the like). Here, the wearing environment and the like of the user represents information such as whether the user mostly uses the lens to do outdoor activities, or the user mostly uses the lens to de indoor activities, or the user does not particularly mostly uses the lens to do outdoor activities or indoor activities in association with his (or her)

career and hobby, and whether the user has experience of using a progressive addition lens.

Similarly, there is disclosed another technique for providing a progressive addition lens with a design most suitable for each individual user from a plurality of prepared progressive addition lenses each with different designs (see Patent Document 2).

This technique is developed to acquire detail individual information of each individual user, and design and manufacture a progressive addition lens optimally customized for the user based on the acquired individual information. In such technique, dozens or more basic parameters are prepared, wherein the basic parameters each determines the area of distinct vision of both the distance portion and the near portion, which are bases of the design of the progressive addition lens. As a method for determining one basic parameter from the prepared basic parameters, a first basic parameter based on user's career is selected, further, a second basic parameter based on user's hobby is selected, and thereby basic parameters of the progressive addition lens suitable for the user are selected.

[Patent Document 1] Japanese Unexamined Patent Application Publication No. H03-206417
[Patent Document 2] Patent application publication WO 98/16862

DISCLOSURE OF THE INVENTION

Problems to be Solved by the Invention

The kinds of the selectable basic parameters disclosed in the technique of Patent Document 2 include an intermediate vision emphasized type, a distance and intermediate visions emphasized type, a distance vision emphasized type, an intermediate and near visions emphasized type, a distance-intermediate-near visions balanced type, a near vision emphasized type, a distance and near visions emphasized type and the like, and dozens kinds of design types are prepared by combining emphasis level of each of the kinds of the selectable basic parameters and corridor length. Further, as described in FIG. 6 of Patent Document 2, the basic parameters respectively suitable for various life conditions of the user are selected.

In other words, in such technique, when selecting the basic parameters which each determines area of distinct vision of both the distance portion and the near portion (which are bases of the design of the progressive addition lens), the information to be considered is limited to information on user's career and hobby and information on user's spectacles-wearing history.

On the other hand, with regard to one balance type progressive addition lens, there are a case where the user is satisfied with the lens and a case where the user is dissatisfied with the lens. In the case where the user is dissatisfied with the lens, in many cases the dissatisfaction of the user can be eliminated simply by adjusting the state of fitting point of the spectacles. Further, it is becoming known that the content of the dissatisfaction changes depending on whether the distance power of the user is positive or negative, how strong the distance power is, how much the addition power is increased (or reduced) compared with the previous spectacles, how much the difference of power between the left lens and right lens is, and the like. Further, the basic design of the progressive addition lens suitable for the user may need to be changed based on the opinion of the spectacles store (as expert's opinion) obtained by communication between the spectacles store and the user.

Thus, it is considered that, when considering the method for selecting a basic design distribution of the progressive addition lens of each design type, there is much other information needed to be considered in addition to the information such as what is user's career and hobby (i.e., for what purpose and under what environment does the user mainly use the spectacles), what life scenes are important to the user, and the like.

Further, the current reality is that, although the spectacles store has many experiences on selling the balance type progressive addition lenses, it has less experience on selling progressive addition lenses having a basic design distribution exclusively designed to meet the specific use requirements based on various life information of the user, since such lenses are uncommon. Thus, in the case of selling such progressive addition lenses exclusively designed to meet the specific use requirements, there is a concern that, after the completed spectacles has been delivered to the user, the user might feel dissatisfactions he (or her) has never felt before, so that the spectacles store will take big risk.

In view of the aforesaid problems, it is an object of the present invention to select a lens design standard suitable for the user from a basic design distribution group and a corridor length by taking into consideration not only spectacles-wearing history and life conditions such as career and hobby of the user, but also at least either of use conditions and distance power of the spectacles, wherein the basic design distribution group determines the distribution of a distance vision area and a near vision area.

Means for Solving the Problems

To solve the aforesaid problems, a lens design standard selecting method according to an aspect of the present invention is adapted for selecting a lens design standard from a basic design distribution group and a corridor length, the basic design distribution group determining the distribution of a distance vision area and a near vision area of a progressive addition lens pair, the method comprises the following steps:

(1) A step for preparing design variations which consist of a plurality of basic design distribution groups different from each other in area-division between the distance vision area and the near vision area, and a plurality of corridor lengths different from each other.

(2) A parameter setting step for inputting parameters at least originating from: prescription information of a user who uses the progressive addition lens pair, life environmental information of the user, and frame shape information of a frame for holding the progressive addition lens pair.

(3) A step for selecting a basic design distribution group from the plurality of basic design distribution groups based on the inputted parameters.

(4) A step for selecting a corridor length based on the inputted parameters.

(5) A step for selecting a lens design standard from the basic design distribution group and the corridor length selected from the design variations.

Further, in the parameter setting step, a distance between a vertex of a rear surface of a right progressive addition lens and a vertex of a cornea of a right eye and a distance between a vertex of a rear surface of a left progressive addition lens and a vertex of a cornea of a left eye calculated based on the prescription information of the user and the frame shape information in a state where the spectacles is worn by the user are included into setting elements of the parameters.

Human eye rotates when viewing near objects and when viewing distant objects. Due to such rotation, an angle is formed between the line-of-sight when viewing distant objects and the line-of-sight when viewing near objects. The near vision area is an area around the intersection of the line-of-sight with the lens when viewing near objects, and the distance vision area is an area around the intersection of the line-of-sight with the lens when viewing distant objects. If the intersection of each line-of-sight with the lens is not consistent with the corresponding area, the user will feel distortion and blurring. However, due to physical features of the user and difference of frame shape, difference will be caused in distance between the vertex of the rear surface of the progressive addition lens and the vertex of the cornea of the user. The smaller such distance is, the more the near vision area and distance vision area necessary for the user are close to each other; and the larger such distance is, the less the near vision area and distance vision area are close to each other. According to the present invention, by incorporating the distance between the vertex of the rear surface of the right progressive addition lens and the vertex of the cornea of the right eye and the distance between the vertex of the rear surface of the left progressive addition lens and the vertex of the cornea of the left eye into the setting elements of the parameters, it is possible to provide, a lens which is less likely to let the user feel distortion and blurring.

Similarly, a lens design standard selecting method according to another aspect of the present invention is adapted for selecting a lens design standard from a basic design distribution group and a corridor length, the basic design distribution group determining the distribution of a distance vision area and a near vision area of a progressive addition lens pair, the method also comprises the aforesaid step (1) to step (5). Further, in the parameter setting step, a distance power based on the prescription information of the user is included into setting elements of the parameters.

In the description of the present invention, the term of "distance power" means a state of overall power when viewing distant objects, and includes elements of at least distance spherical power and cylindrical power (so-called "astigmatic power").

When a person views distant objects, if the position of the focal point is on the cornea side of the retina (i.e., the position of the focal point is in front of the retina), then the person's distance power is negative (−); while if the position of the focal point is behind the cornea, then the person's distance power is positive (+). Since the position of the focal point is considered as a reference, the angle formed by the line-of-sight when viewing distant objects and the line-of-sight when viewing near objects is different. The more negative the distance power is, the smaller the angle is; the more positive the distance power is, the larger the angle is. in accordance with the change of the angle, the more negative the distance power is, the more the near vision area and distance vision area are close to each other, and the more positive the distance power is, the less the near vision area and distance vision area are close to each other. According to the selecting method of the present invention, since the distance power is incorporated into the setting elements of the parameters, it is possible to provide a progressive addition lens excellent in clarity of view to the user.

As described above, the present invention provides a lens design standard selecting method adapted for selecting a lens design standard from a basic design distribution group and a corridor length, the basic design distribution group determining the distribution of the distance vision area and the near vision area of the progressive addition lens pair. As described as aforesaid (1), the method includes the step for preparing design variations which consist of the plurality of basic design distribution groups different from each other in area-division between the distance vision area and the near vision area and the plurality of corridor lengths different from each other. Here, the "basic design distribution group" is for exemplifying the balance between the distance vision area and the near vision area by type, and concrete aberration distribution of the basic design distribution group varies depending on the prescription power of the user and, if the user has astigma, the cylindrical power, the cylinder axis direction and the like of the user. Thus, "basic design distribution group" is named because it is not identified as one kind of aberration distribution. Further, in the present invention, a plurality of design variations which consist of the basic design distribution group and a plurality of corridor lengths are previously prepared.

Further, as described as aforesaid (2), in the present invention, the parameters at least originating from the prescription information of the user, the life environmental information of the user and the frame shape information are set. In the present invention, as such parameters, the distance between the vertex of the rear surface of the right progressive addition lens and the vertex of the cornea of the right eye and the distance between the vertex of the rear surface of the left progressive addition lens and the vertex of the cornea of the left eye in the state where the spectacles is worn by the user (i.e., vertex-to-vertex distance) calculated based on the prescription information and the frame shape information of the user is included into the setting elements of the parameters, or the distance power based on the prescription information of the user is included into the setting elements of the parameters.

The parameters originating from the life environmental information are included in the selecting method of the present invention. The life environmental information is a criteria for judging "how far the objects mostly viewed by the user are away from the user" in user's daily life. For example, it is preferred that a design distribution group with clearer near vision is selected for the user whose job involves desk work and whose hobby is reading. Further, it is preferred that a design distribution group with clearer distance vision is selected for the user whose job involves driving and whose hobby is outdoor activities. According to the selecting method the present invention, since the life environmental information of the user is incorporated into the setting elements of the parameters, it is possible to provide a progressive addition lens with a clearer vision suitable for user's lifestyle.

Further, the parameters originating from the frame shape information are included in the selecting method of the present invention. There are two areas formed on the progressive addition lens includes, which are the near vision area and the distance vision area. Such two areas are respectively arranged in suitable positions of the progressive addition lens, so that the effect of the progressive addition lens can be exerted. Thus, if the optical design of the lens is not well done and therefore such two areas are respectively arranged in suitable positions, the user will not be able to feel clear vision. However, the spectacles frame has various different designs in shape. Further, the user selects the frame taking into consideration of his (or her) physical features such as the height of his (or her) nose bridge and the like, his (or her) individual taste, and the fashion of the time. The design of the spectacles frame is associated with aesthetic sense and taste of the user, and is an element which affects the feeling of satisfaction of the user with the spectacles.

According to the selecting method of the present invention, the design condition of the progressive addition lens can be set based on conditions including the parameters of the frame shape information selected by the user. According to the present invention, it is possible for the user to obtain spectacles with vision correction ability in both the distance vision area and a near vision area, substantially without constraint on the frame shape.

In the present invention, based on such parameters, a basic design distribution group and a corridor length are selected respectively in the aforesaid step (3) and step (4), and a lens design standard is selected from the selected basic design distribution group and the selected corridor length in the aforesaid step (5).

In such a manner, in the present invention, when selecting the lens design standard selected from the distribution of the distance vision area and the near vision area and the corridor length, a plurality of design variations consisting of a plurality of basic design distribution groups and a plurality of corridor lengths are previously prepared. Further, as parameters for selecting one design variation from the plurality of design variations, the vertex-to-vertex distance when the user wears the spectacles or the distance power is included in the setting elements of the parameters.

Incidentally, in the present invention, a plurality of design variations are prepared, and, as indexes for selecting a design variation from the plurality of design variations, the vertex-to-vertex distance when the user wears the spectacles or the distance power is included in the parameters in addition to the information such as the life environmental information and the career, instead of determining the width of the area of distinct vision of a specific distance vision and the corridor length to identify the concrete aberration distribution simply based on the information such as career, life environmental information, spectacles-wearing history and the like of the user. Further, based on the design variation selected in the aforesaid manner, an optical design is finally made to fit user based on the prescription power and the like.

In such a manner, by also regarding the information originating from the wearing state and prescription such as the vertex-to-vertex distance and the distance power as indexes for selecting a lens design standard from the design variations, it is possible to provide a progressive addition lens with an overall balanced distribution of the distance vision area and the near vision area to the user.

Advantages of the Invention

According to the present invention, by selecting the basic design distribution group and corridor length taking into consideration of at least either the use conditions or the distance power of the spectacles, it is possible to select a lens design standard more suitable for the user from the basic design distribution group, which determines the distribution of the distance vision area and the near vision area, and the corridor length.

BEST MODES FOR CARRYING OUT THE INVENTION

Figure 1:
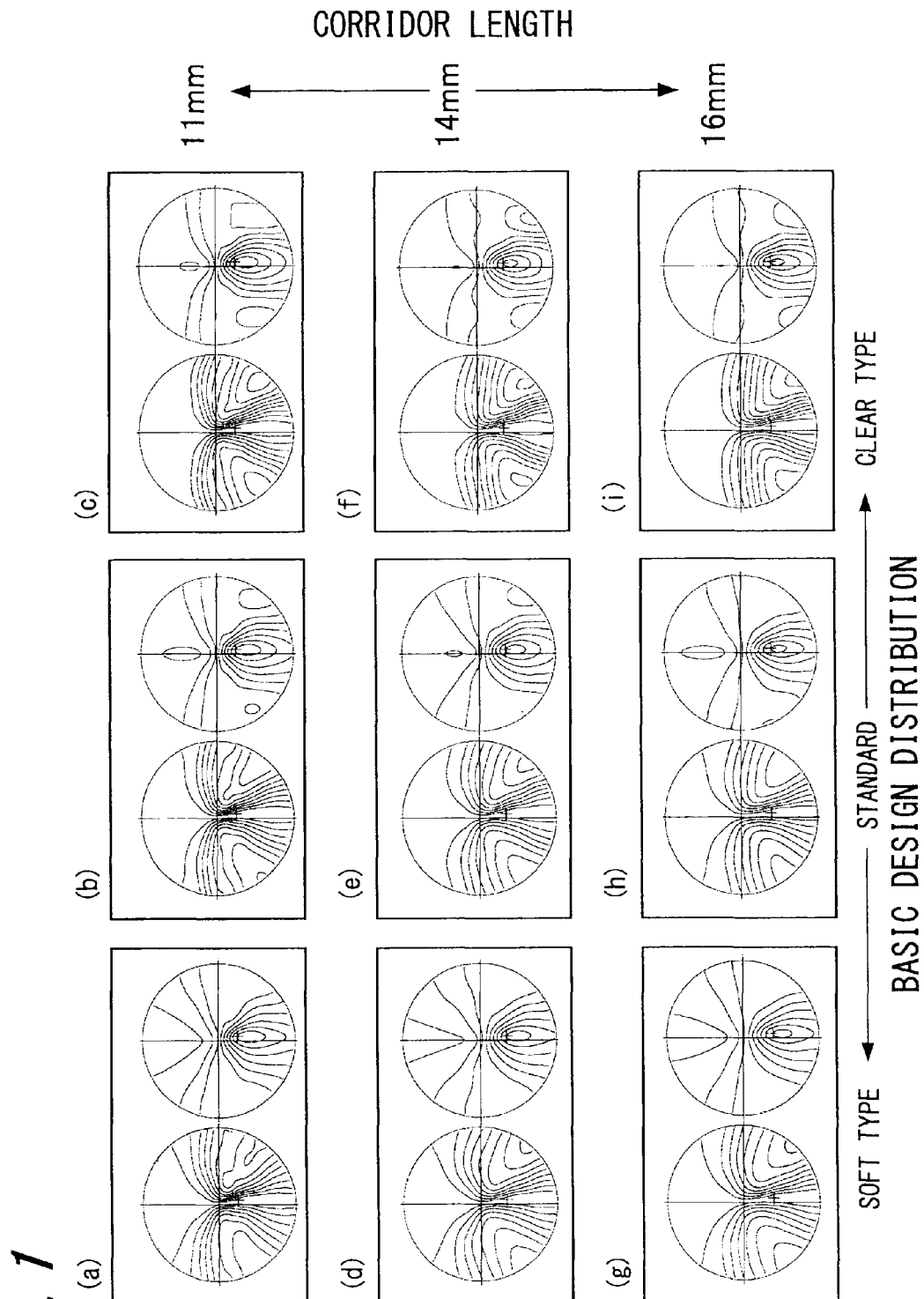
FIG. 1 shows a trend of design standard examples of a method for selecting lens design standard according to an embodiment of the present invention, wherein each example corresponds to a basic design distribution group and a corridor length.

The best embodiment for carrying out the present invention will be described below, however it should be understood that the present invention is not limited to this embodiment.

A method for selecting a lens design standard according to the present embodiment will be described in the following order.

[1] Steps for setting design variations
[2] Steps for setting parameters of basic design distribution group and corridor length
[3] Steps for selecting basic design distribution group
[4] Steps for selecting corridor length
[5] Steps for selecting lens design standard Incidentally, in the description of the present invention, the term of "user" means users who use the designed progressive addition lens, which include patients to whom a prescription power is prescribed by an ophthalmologist or the like to obtain the designed progressive addition lens as a medical appliance.

Further, the term of "prescription information" includes physical features of the user, such as the distance between pupils, in addition to the eyesight of the user (including the patient).

Further, the term of "frame information" includes a bending angle in a lateral direction of the frame, a tilt angle (i.e., a forward tilt angle) with respect to the eye in a vertical direction and the like, in addition to the shape of the frame.

[1] Steps for Setting Design Variations

The present embodiment provides a method for selecting a lens design standard for providing a so-called "balance type progressive addition lens" designed for general purpose, instead of for a specific purpose such as for indoor use, outdoor use or the like. As design variations of such balance type progressive addition lens, three kinds of corridor lengths and three kinds of basic design distribution groups for each corridor length are prepared as shown in (a) to (i) of FIG. 1, wherein, for each corridor length, the three kinds of basic design distribution groups are slightly different from each other in balance between the distance vision area and the near vision area.

The first basic design distribution group is a standard type basic design distribution group which play a major role in lens designing, and is particularly a basic design distribution group in all of the balance types. The basic design distribution examples of the first basic design distribution group corresponding to each of the corridor lengths are shown in (b), (e) and (h) of FIG. 1. Incidentally, in each of the basic design distribution examples described below, the left side shows an astigmatism distribution, and the right side shows an average power distribution.

The second basic design distribution group is a type having a slightly narrower clearly viewable vision in the distance vision area than that of the standard basic design distribution group, and is designed for those users who do not need to have a particularly wide clearly viewable vision with small distortion caused by aberration in the distance vision area of the progressive addition lens. In the case of the second basic design distribution group, the basic design distribution examples corresponding to each of the corridor lengths are shown in (a), (d) and (g) of FIG. 1. By having such design distribution, the distortion and blurring of image in the lateral portion ranging from the intermediate vision area to the near vision area, the fluctuation of image caused when the user moves his (or her) line-of-sight and the like can be reduced. In other words, the second basic design distribution group is a somewhat soft type basic design distribution group which has a slightly wider intermediate vision area and near vision area.

The third basic design distribution group is a type having a slightly narrower clearly viewable vision with small distortion in the area ranging from the intermediate vision area to the near vision area, and is designed for those users who are apt to care about the slight blurring of image in the peripheral portion of the distance vision area. In the case of the third basic design distribution group, the basic design distribution examples corresponding to each of the corridor lengths are respectively shown in (c), (f) and (i) of FIG. 1. By having such design distribution, although the distortion and blurring of image in the lateral portion ranging from the intermediate vision area to the near vision area, the fluctuation of image caused when the user moves his (or her) line-of-sight and the like are slightly increased, the clearly viewable vision in the distance vision area becomes slightly wider. In other words, the third basic design distribution group is a somewhat clear type basic design distribution group which has wider clearly viewable vision of the distance vision area than that of the standard type basic design distribution group.

Incidentally, as described above, the basic design distribution group is not a fixed pair of aberration distribution and average power distribution, but its actual aberration distribution can be suitably changed depending on user's prescription power, i.e., distance spherical power, cylindrical power, cylinder axis direction and the like. In other words, based on each of the basic design distribution groups shown in (a) to (i) of FIG. 1, one aberration distribution and one average power distribution are designed based on the prescription power of each user. Thus, in the description of the present invention, the aberration distributions and the average power distributions shown in (a) to (i) of FIG. 1 are each referred to as a "basic design distribution group".

As is known from the basic aberration distribution and basic average power distribution of each of the basic design distribution groups shown in (a) to (i) of FIG. 1, the basic design distribution groups for each of the corridor lengths are slightly different from each other with the standard type as the center. The difference of these basic design distribution groups from each other is such a level that, even if any one of these types is selected, the selected type substantially has a balance typed design, and therefore the spectacles store almost has no need to feel risky.

Next, the method for selecting a design standard most suitable for the person who purchases the progressive addition lens from nine kinds of basic design distribution variations formed by the three kinds of corridor lengths and the three kinds of basic design distribution groups will be described below.

Figure 2:
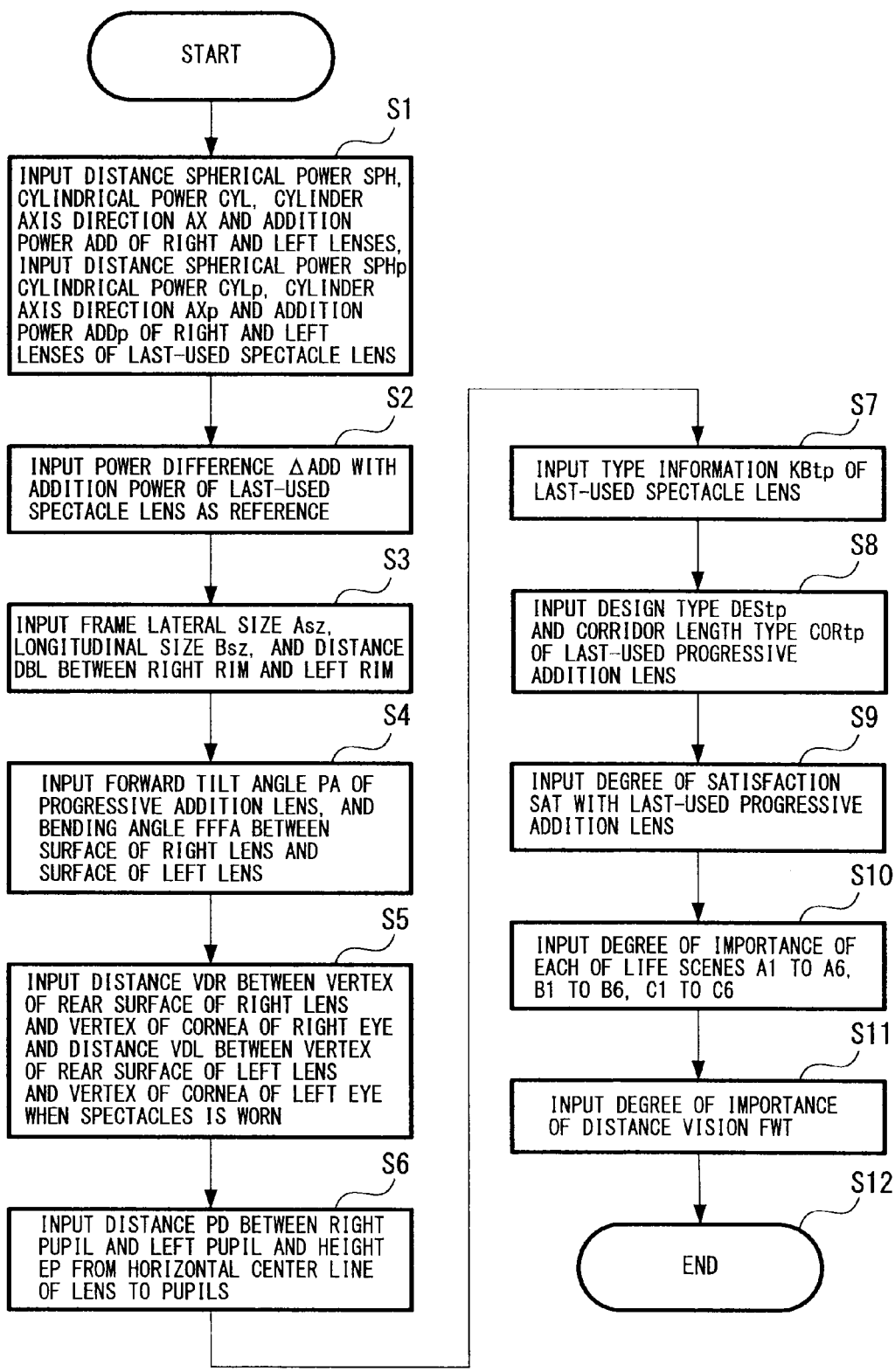
FIG. 2 is a flowchart showing an example of steps for inputting parameters in the method for selecting lens design standard according to the aforesaid embodiment of the present invention.

[2] Steps for Setting Parameters of Basic Design Distribution Group and Corridor Length FIG. 2 is a flowchart showing an example of steps for inputting parameters. The steps for inputting parameters of the basic design distribution group and corridor length will be described below based on the flowchart shown in FIG. 2.

First, a distance spherical power SPH, a cylindrical power CYL, a cylinder axis direction AX and an addition power ADD of the right and left lenses are inputted (step S1).

In step S1, as the prescription information, the eyesight-related information, is inputted as table 1. To be specific, a distance spherical power SPHR, a cylindrical power CYLR, a cylinder axis direction AXR and an addition power ADDR of the right lens; and a distance spherical power SPHL, a cylindrical power CYLL, a cylinder axis direction AXL and an addition power ADDL of the left lens are inputted.

At this time, in the case where the prescription information of the last-used spectacle lens of the user is known, the distance spherical power SPHp, the cylindrical power CYLp, the cylinder axis direction AXp and the addition power ADDp of the right lens and left lens of the last spectacles are inputted (step S1). To be specific, the distance spherical power SPHpR, the cylindrical power CYLpR, the cylinder axis direction AXpR and the addition power ADDpR of the right lens; and the distance spherical power SPHpL, the cylindrical power CYLpL, the cylinder axis direction AXpL and the addition power ADDpL of the left lens are inputted.

Next, in the case where the last-used spectacle lens of the user is a progressive addition lens, the difference ΔADD between the addition power of the last-used spectacle lens and the addition power of the new spectacle lens is inputted (step S2).

To be specific, in step S2, in the case where the spectacle lenses ever used of the user are progressive addition lenses, the difference ΔADDR between the right lens of the progressive addition lens to be newly created and the right lens of the last-used progressive addition lens, and the difference ΔADDL between the left lens of the progressive addition lens to be newly created and the left lens of the last-used progressive addition lens are inputted. Incidentally, the values indicated in table 1 are given as an example.

TABLE 1

| | Input prescription information | | | | |
| --- | --- | --- | --- | --- | --- |
| | Distance spherical power SPH (D) | Cylindrical power CYL (D) | Cylinder axis direction AX (°) | Addition power ADD (D) | Addition power difference between this time and last time ΔADD (D) |
| Right lens R | −3.00 | −1.25 | 135 | 2.25 | +0.50 |
| Left lens L | −5.50 | | | 2.25 | +0.50 | distribution groups shown in (a) to (i) of FIG. 1, the basic design distribution groups for each of the corridor lengths are slightly different from each other with the standard type as the center. The difference of these basic design distribution Next, as parameters originating from frame shape, a lateral size Asz of the frame of the spectacles, a longitudinal size Bsz of the frame of the spectacles, and a distance DBL between the right rim and the left rim are inputted (step S3).

Further, a forward tilt angle PA of the lens, an angle FFFA between the surface of the right lens and the surface of the left lens (i.e., a bending angle) are inputted (step S4).

The data inputted in the aforesaid steps S3 to S6 will be described in detail below with reference to FIGS. 3 to 5.

Figure 3:
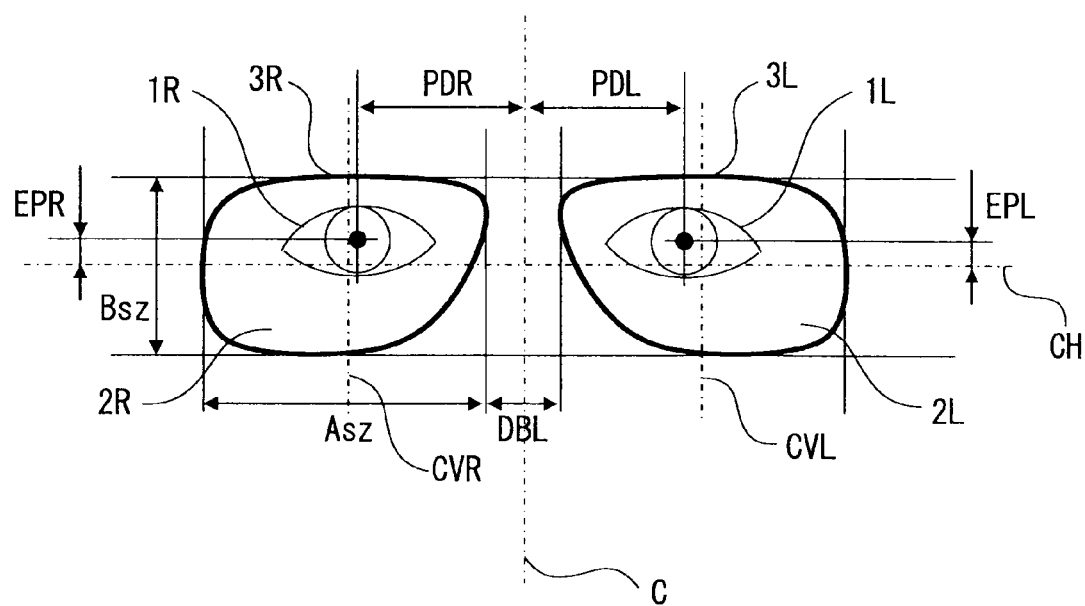
FIG. 3 is a view for explaining parameters originating from the frame shape.

FIG. 3 is a view for explaining the information originating from the frame shape. FIG. 3 shows sizes of the shape of the rims of the frame according to the Boxing System (German Industrial Standard), and specifically shows left and right progressive addition lenses 2L and 2R corresponding to left and right eyes 1L and 1R, and a frame for holding the left and right progressive addition lenses 2L and 2R (i.e., left and right rims 3L and 3R).

The lateral size of the both rims is denoted by a reference Asz, the longitudinal size of the both rims is denoted by a reference Bsz, and the distance between the left rim 3L and the right rim 3R is denoted by a reference DBL. Further, the center line between the left rim and the right rim is indicated by a dashed line C, and the center line of the both left rim 3L and the right rim 3R in the vertical direction is indicated by a dashed line CH. Further, the horizontal distance between the center line C and the pupil of the left eye is denoted by a reference PDL, and the horizontal distance between the center line C and the pupil of the right eye is denoted by a reference PDR. Further, the height from the center line CH to the pupil of the left eye is denoted by a reference EPL, and the height from the center line CH to the pupil of the right eye is denoted by a reference EPR. Incidentally, the center line of the right rim 1R in the vertical direction is indicated by a dashed line CVR, and the center line of the left rim 1L in the vertical direction is indicated by a dashed line CVL.

Figure 4:
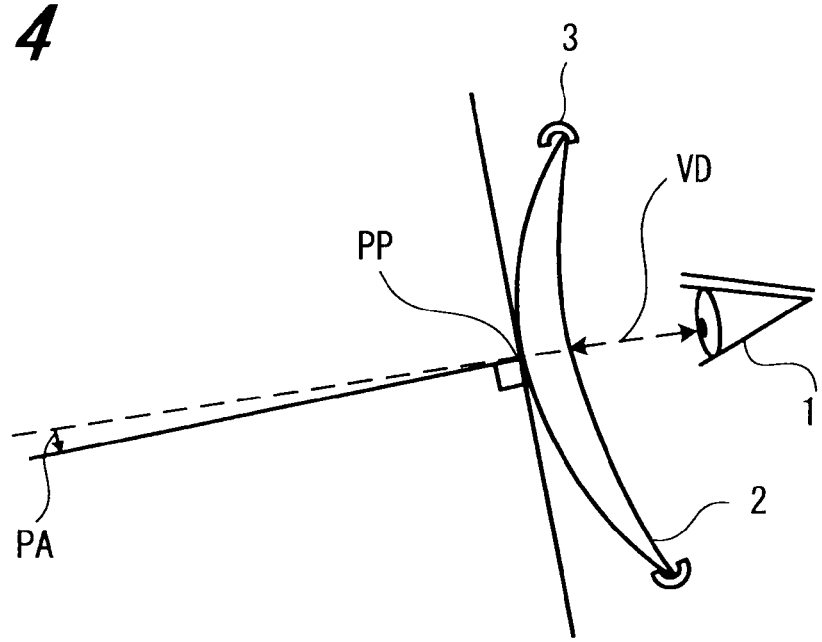
FIG. 4 is another view for explaining parameters originating from the frame shape.

FIG. 4 is a view for explaining a vertex-to-vertex distance VD and a forward tilt angle PA. FIG. 4 shows a cross-section of an eye 1, a progressive addition lens 2 and a frame 3 for holding the progressive addition lens 2. The vertex-to-vertex distance VD is a distance between the vertex of the rear surface of the left/right lens and the vertex of the cornea of the left/right eye of the user in a state where the lens 2 is held by the frame 3 and the frame 3 is worn by the user. Further, the forward tilt angle PA is an angle between the direction of the line-of-sight of the user when the line-of-sight of the user passes through a prism measuring reference point PP and the normal line of the outer surface of the lens 2 at the prism measuring reference point PP.

Figure 5:
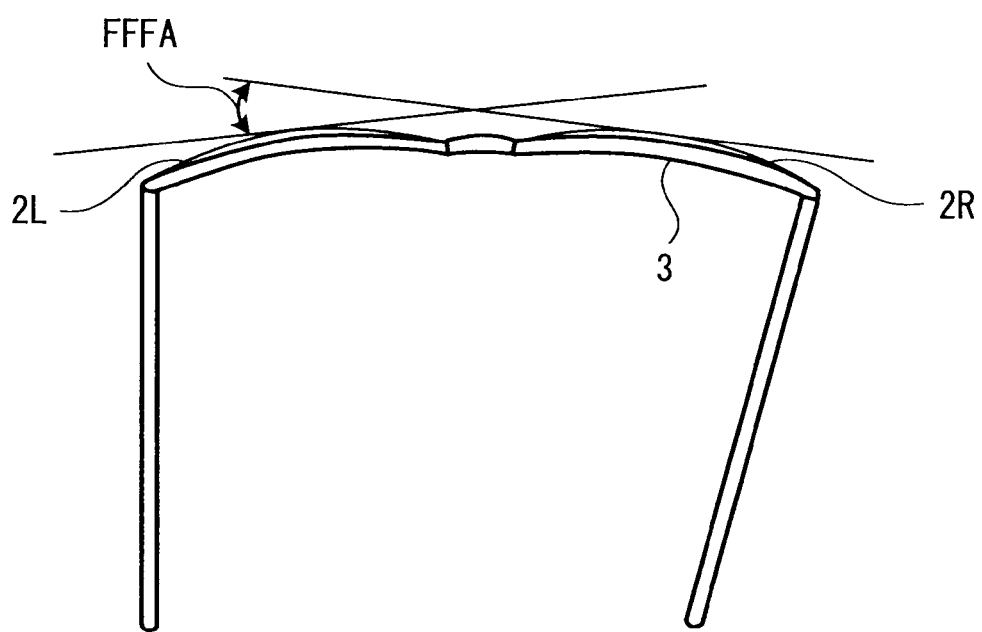
FIG. 5 is further another view for explaining parameters originating from the frame shape.

FIG. 5 is a view for explaining the bending angle of the lenses. As shown in FIG. 5, the bending angle FFFA is an angle between a tangent of the left lens 2L held by the frame 3 at the prism measuring reference point of the left lens 2L and a tangent of the right lens 2R held by the frame 3 at the prism measuring reference point of the right lens 2R. The bending angle FFFA is inputted in step S4.

An example of the information originating from frame shape is shown in table 2 and table 3, and an example of wearing and layout information is shown in table 4.

TABLE 2

Input frame shape information

| Lateral size Asz (mm) | Longitudinal size Bsz (mm) | Distance between right rim and left rim DBL (mm) |
|---|---|---|
| 46 | 32 | 20 |

TABLE 3

| Forward tilt angle of lens PA (°) | Bending angle FFFA (°) |
|---|---|
| 13.0 | 2.5 |

TABLE 4

Input wearing and layout information

| | Vertex-to-vertex distance VD (mm) | Distance between center line and pupil PD (mm) | Height from center line to pupil EP (mm) |
|---|---|---|---|
| Right lens R | 13.2 | 26.5 | 16.0 |
| Left lens L | 13.2 | 28.5 | 16.0 |

Next, the distance VDR between the vertex of the rear surface of the right lens and the vertex of the cornea of the right eye, and the distance VDL between the vertex of the rear surface of the left lens and the vertex of the cornea of the left eye when the spectacles is worn are inputted (step S5). Further, a distance PD between the right pupil and the left pupil, and a height EP from the horizontal center line of the lens to the pupils are inputted (step S6).

Next, type information KBtp is inputted based on lens type of the spectacle lenses ever used (whether the lenses are progressive addition lenses, multifocal lenses, or other lenses) (step S7).

Herein, the type information KBtp of the spectacle lenses ever used, particularly the type information KBtp of the last-used spectacle lens of the user will be described below. Table 5 shown an example of inputting a different value to distinguish whether the last-used spectacle lens is a progressive addition lens (PAL), a multifocal lens (for example, Bi: a bifocal lens), or an other lens. For example, in the case where the last-used spectacle lens is a progressive addition lens (PAL), the value "1" will be inputted; in the case where the last-used spectacle lens is a multifocal lens (a bifocal lens), the value "2" will be inputted; and in the case where the last-used spectacle lens is an other lens, the value "0" will be inputted.

TABLE 5

Example of inputting type information KBtp of last-used spectacles

| 1 |
|---|

PAL = 1, BF = 2, Other = 0

Figure 6:
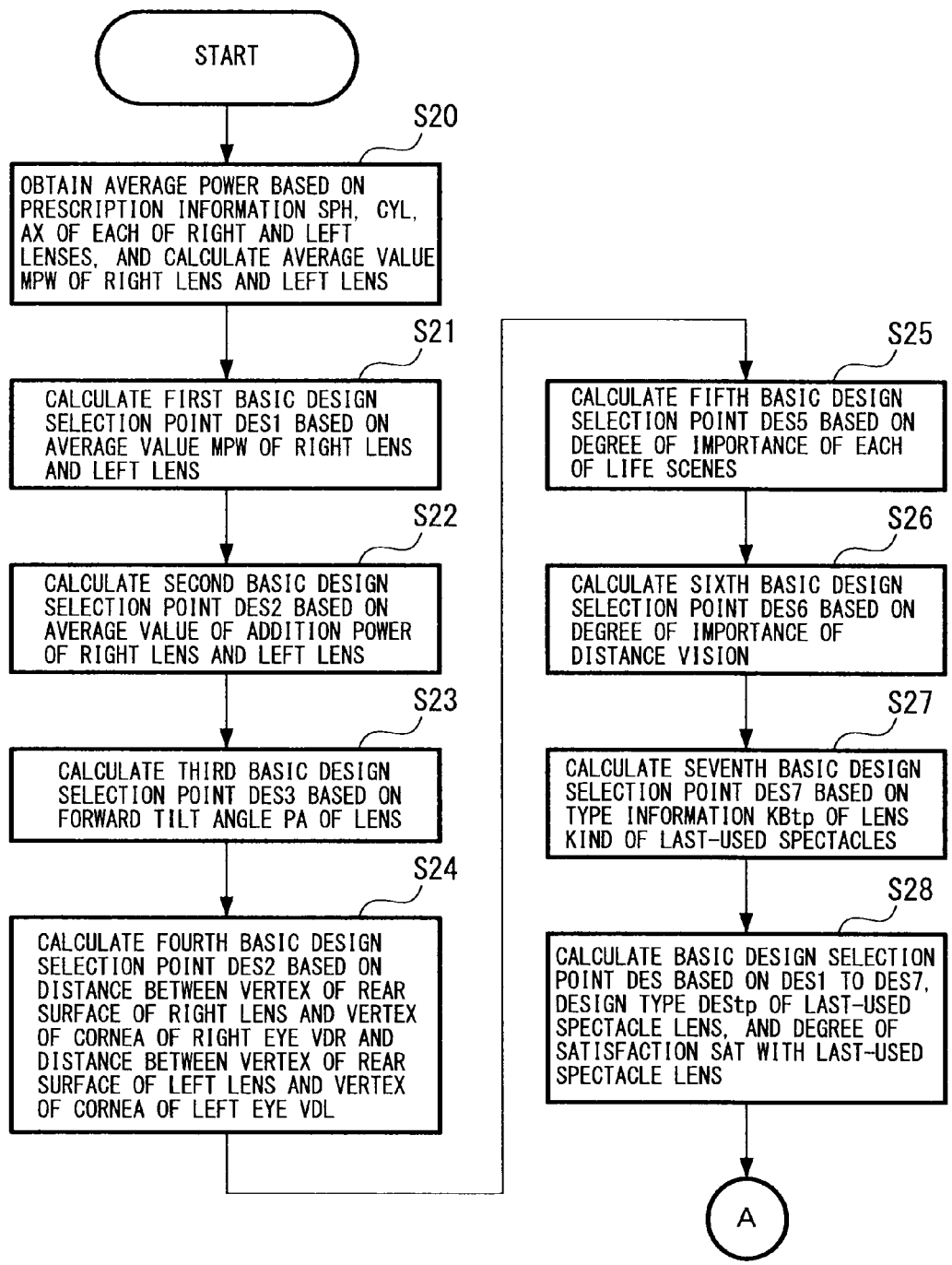
FIG. 6 is a flowchart showing an example of steps for selecting basic design selection points in the method for selecting lens design standard according to the aforesaid embodiment of the present invention.
Figure 7:
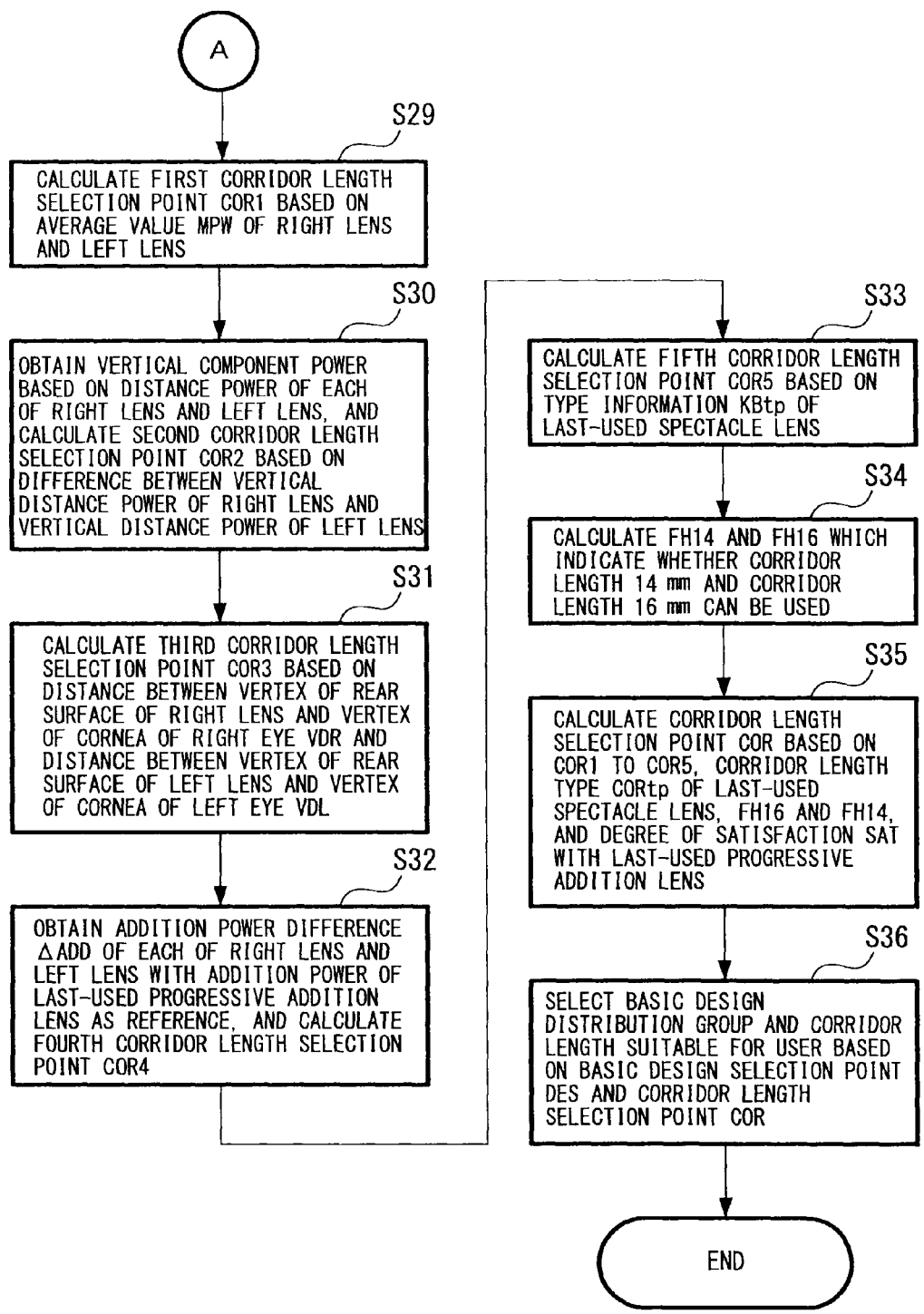
FIG. 7 is a flowchart showing an example of steps for selecting a corridor length in the method for selecting lens design standard according to the aforesaid embodiment of the present invention.

Next, in the case where the last-used spectacle lens is a progressive addition lens, a design type DEStp (i.e., whether the lens is a soft type, a clear type, or a standard type) and a corridor length type CORtp of the last-used progressive addition lens are inputted (step S8). An example of the design type DEStp and the corridor length type CORtp of the last-used progressive addition lens is shown in FIG. 6.

In the case where the design type is the soft type shown as the basic design distribution examples (a), (d) and (g) of FIG. 1, the value "1" will be inputted as the design type; in the case where the design type is the standard type shown as the basic design distribution examples (b), (e) and (h) of FIG. 1, the value "2" will be inputted as the design type; and in the case where the design type is the clear type shown as the basic design distribution examples (c), (f) and (i) of FIG. 1, the value "3" will be inputted as the design type. In the case where the design type is an other type, the value "0" will be inputted as the design type.

Further, for example, in the case where the corridor length is equal to or less than 12 mm, the value "1" (which represents a short corridor length) will be inputted as the corridor length type; in the case where the corridor length is in a ranged of "12<mm corridor length≤mm", the value "2" (which represents an intermediate-short corridor length) will be inputted as the corridor length type; in the case where the corridor length is in a range of "14 mm<corridor length≤16 mm", the value "3" (which represents an intermediate corridor length) will be inputted as the corridor length type; and in the case where the corridor length is equal to or more than 16 mm, the value "4" (which represents a long corridor length) will be inputted as the corridor length type.

TABLE 6

Example of inputting design type and corridor length type of last-used progressive addition lens

| DEStp | CORtp |
|---|---|
| 1 | 3 |

*DEStp: design type
1: soft
2: standard
3: clear
0: unknown
*CORtp: corridor length type
1: short . . . ≤12 mm
2: intermediate-short . . . <14 mm
3: intermediate . . . <16 mm
4: long . . . ≥16 mm
0: unknown Incidentally, as shown in table 7, with respect to the aforesaid design type and corridor length type of the last-used progressive addition lens, a list may be prepared in which the design type and corridor length type are previously identified corresponding to the product names and corridor lengths of each manufacturer. Table 7 shows an example of inputting design type and corridor length type of each of progressive addition lens products of Company A, Company B and Company C. The product name and the corridor length of the progressive addition lens can be known by checking the sales history of the spectacles store or by checking the permanent mark on the lens.

TABLE 7

Example of classification list of design type and corridor length type for each company

| Product name (Corridor length) | | Design type DEStp | Corridor length type CORtp |
|---|---|---|---|
| Company A | HAA (14 mm) | 1 | 3 |
| | HAA (11 mm) | 1 | 1 |
| | HBB (14 mm) | 1 | 3 |
| | HBB (11 mm) | 1 | 1 |
| | HGG (15 mm) | 3 | 3 |
| | HHH (13 mm) | 3 | 2 |
| | HII (11 mm) | 3 | 1 |
| Company B | EEP | 3 | 3 |
| | EED | 2 | 3 |
| | EEPN | 2 | 3 |
| | EEC | 3 | 3 |
| | EEVF | 2 | 2 |
| Company C | SSP (14 mm) | 2 | 4 |
| | SSP (10 mm) | 2 | 2 |
| | SSPE (14 mm) | 3 | 4 |
| | SSPE (12 mm) | 3 | 3 |
| | SSPE (10 mm) | 3 | 2 |

By previously preparing the data list shown in table 7, the design type DEStp and corridor length type CORtp listed in table 7 can be read, and the read values can be simply inputted as the design type DEStp and the corridor length type CORtp shown in table 6.

Next, in the case where the last-used spectacle lens is a progressive addition lens, a degree of satisfaction SAT with the lens is inputted (step S9). An example of the degree of satisfaction SAT inputted in step S9 is shown in table 8. Table 8 shows an example in which the degree of satisfaction SAT with the last-used progressive addition lens is indicated by values of 1 to 5. The degree of satisfaction with the progressive addition lens can be obtained by a staff of the spectacles store based on hearing the opinion of the user.

TABLE 8

Example of inputting degree of satisfaction of last-used progressive addition lens

| SAT |
|---|
| 1 |

*SAT: degree of satisfaction
1: very satisfied
2: satisfied
3: neither satisfied nor unsatisfied
4: unsatisfied
5: very unsatisfied Next, degree of importance of each of life scenes A1 to A6, B1 to B6, and C1 to C6 is inputted (step S10). In step S10, the degree of importance of each of various life scenes associated with the career and hobby of the user is inputted. An example of the degree of importance of various life scenes is shown in FIGS. 9 to 11.

TABLE 9

Example of inputting degree of importance of each of various life scenes

| A1 | 3 | TV viewing | Soft |
| A2 | 4 | Personal computer operation | |
| A3 | 1 | Musical instrument performance | |
| A4 | 1 | Cooking | |
| A5 | 1 | Gardening | |
| A6 | 1 | Dancing and fitness | |

5 = very important,
4 = important,
3 = ordinary,
2 = not important,
1 = not important at all

TABLE 10

| B1 | 1 | Shopping | Standard |
| B2 | 1 | Dinner/Party | |
| B3 | 4 | Travel/Resort | |
| B4 | 1 | Landscape photography | |
| B5 | 1 | Running | |
| B6 | 1 | Walking | |

TABLE 11

| C1 | 5 | Driving | Clear |
| C2 | 1 | Bike-riding/Touring | |
| C3 | 1 | Watching match in stadium | |
| C4 | 4 | Playing golf | |
| C5 | 3 | Mountain-climbing /Hiking | |
| C6 | 4 | Watching plays and movies | |

Table 9 shows an example in which the degree of importance of each of various life scenes suitable for the soft type basic design distribution group shown in basic design distribution examples (a), (d) and (g) of FIG. 1 is inputted. Items such as TV viewing, personal computer operation, musical instrument performance, cooking, gardening, dancing, fitness and the like can be listed as examples of the life scene. Table 10 shows an example in which the degree of importance of each of various life scenes suitable for the standard type basic design distribution group shown in basic design distribution examples (b), (e) and (h) of FIG. 1 is inputted. Items such as shopping, dinner/party, travel/resort, landscape photography, running, walking and the like can be listed as examples of the life scene. Table 11 shows an example in which the degree of importance of each of various life scenes suitable for the clear type basic design distribution group shown in basic design distribution examples (c), (f) and (i) of FIG. 1 is inputted. Items such as driving, bike-riding/touring, watching match in stadium, playing golf, mountain-climbing/hiking, watching plays and movies can be listed as examples of the life scene. Incidentally, examples of the life scene are not limited to the items mentioned above, but can include various other life scenes. Also, a plurality of types of item tables may be prepared according to different gender, age-group and the like.

Tables 9 to 11 show an example in which the degree of importance of each of various life scenes (5=very important, 4=important, 3=ordinary, 2=not important, 1=not important at all) is inputted in the entry field of each life scene as A1 to A6 in the case of a soft type, B1 to B6 in the case of a standard type, and C1 to C6 in the case of a clear type. The inputted values and items are not limited to those described above. It is preferred that the degree of importance of each of various life scenes is determined by a staff of the spectacles store based on hearing the opinion of the user. By inputting values based on the judgment of the user, it becomes possible to select the optimum basic design distribution group and corridor length more suitable for user's desire.

Next, a degree of importance of distance vision FWT to the user is inputted (step S11). An example of the degree of importance of distance vision inputted in step S11 is shown in table 12. Table 12 shows an example in which the degree of importance of distance vision FWT is inputted as a value in a range between "−100" to "+100".

TABLE 12

| Example of inputting degree of importance of distance vision FWT |
|---|
| −50 |

Unimportant = −100~, Ordinary = 0~, Very important = +100

The degree of importance of distance vision may particularly be judged as input data by other person than the user, such as a staff of the spectacles store, however it is preferred that the degree of importance of distance vision is judged by, for example, a staff of the spectacles store (as an expert) based on the communication between the user and the staff of the spectacles store. To be specific, in the position of an expert, the staff of the spectacles store comprehensively judges the degree of importance of distance vision in consideration of various aspects such as: for what purpose and under what environment does the user use the progressive addition lens, the details of the dissatisfaction of the user with the spectacles lenses ever used, the expectations of the user toward the progressive addition lens to newly purchase, and the like.

Incidentally, it is obvious that the input steps S1 to S11 do not have to be executed in the aforesaid order, but the order can be changed.

[3] Steps for Selecting Basic Design Distribution Group

Next, the method for selecting a progressive addition lens most suitable for the user based on the user information inputted in the aforesaid manner will be described below.

First, steps for selecting a basic design distribution group will be described below with reference to the flowchart of FIG. 6. Here, the basic design distribution group of the progressive addition lens is selected by obtaining first to seventh basic design selection points DES1 to DES7 based on calculations described below, and finally obtaining a basic design selection point DES based on the obtained first to seventh basic design selection points DES1 to DES7 and values obtained during the process for obtaining the DES1 to DES7. Whether the basic design distribution group is a soft type, a standard type, or a clear type is determined based on the value of the finally obtained DES.

Incidentally, in the following example, when the value of the first to seventh basic design selection points DES1 to DES7 is negative, it means that "the user is suitable for a design leaning to soft type", while when the value of the first to seventh basic design selection points DES1 to DES7 is positive, it means that "the user is suitable for a design leaning to clear type". Further, a coefficient is added to the calculating formula of each of the points in order to adjust the weight of each of the points, however the value of the coefficient is not limited to the example described below, but can be changed according to the level of the weight of each of the points.

[3-1] First Basic Design Selection Point DES1

A first basic design selection point will be described below. When the user wears the spectacles to take a wide view of distant objects, the eye of the user will rotate. The rotation angle of the eye actually changes depending on the power of the spectacle lens. For example, the rotation angle of the eye is larger in the case where the power of the spectacle lens is positive than in the case where the power of the spectacle lens is negative. Further, it is known that, in the case where the power of the spectacle lens is positive, the stronger the power is, the larger the rotation angle of the eye is; while in the case where the power of the spectacle lens is negative, the stronger the power is, the smaller the rotation angle of the eye is. If the above knowledge is applied to the user of the progressive addition lens, it can be known that, in the case where the distance power (which includes distance spherical power component and cylindrical power component) is positive, the stronger the distance power is, the larger the rotation angle of the eye is when the user takes a wide view of distant objects, while in the case where the distance power is negative, the stronger the distance power is, the smaller the rotation angle of the eye is.

Further, it is known from the wearing tests of the progressive addition lens performed so far that, there is a trend to select a design leaning to clear type with a wide distance vision area for the user having weak distance power, regardless of whether the distance power of the progressive addition lens is positive or negative. Thus, the following method can be considered as a method for selecting a basic design distribution group of the progressive addition lens based on whether the distance power is positive or negative and the strength of the distance power. To be specific, it is considered to select a basic design distribution group leaning to clear type with a wide distance vision area for the user having a distance power from weak power to positive power. On the other hand, it is considered that it is not particularly necessary to select a design leaning to clear type with a wide distance vision area for the user whose distance power is negative.

As shown in FIG. 6, in this example, first an average power of each of the right and left lenses is obtained based on the distance spherical power SPH, the cylindrical power CYL and the cylinder axis direction AX of each of the right and left lenses, and an average value MPW of the average power of the right lens and the average power of the left lens is calculated (step S20). Further, the first basic design selection point DES1 is calculated from the average value MPW of the average power of the right lens and the average power of the left lens (step S21).

In step S20, the average power of each of the right and left lenses is obtained based on the inputted distance power of each of the right and left lenses of the user, and the average value MPW of the average power of the right lens and left lens is obtained, and the first basic design selection point DES1 is obtained as follows based on the average value MPW.

$$MPW=\{(SPHR+CYLR/2)+(SPHL+CYLL/2)\}/2$$

When $$-5.00 \leq MPW < -2.00$$

then $$DES1=(MPW+4) \times 5.0$$

Here, the calculating formula is set so that the DES1 becomes zero when MPW=−4 (myopia), however the present invention is not limited thereto. The threshold can be a value within a range between "−3" and "−5", more preferably within a range between "−3.5" and "−4.5".

On the other hand, when $$MPW \geq -2.00,$$

then $$DES1=10.0.$$

This is because a design leaning to clear type is preferable for a distance power from weak power to positive power.

Further, when $$MPW < -5.00,$$

then $$DES1=-5.$$

In such a case, a design leaning to soft type is selected.

By the process described above, the first basic design selection point DES1 is selected. In other words, in this case, the first basic design selection point DES1 is selected by selecting a basic design distribution group leaning to clear type in the case where MPW is higher than a predetermined negative power.

Incidentally, the threshold of the negative power is within a range of "−2.00" to "−5.00" in this example, however the threshold of the negative power is not limited to such a range, but a value within a range of "−1.00" to "−3.00", preferably within a range of "−1.50" to "−2.50" can be selected as a threshold of the weak power of the distance power. Further, a value within a range of "−4.00" to "−6.00", preferably within a range of "−4.50" to "−5.50" can be selected as a threshold of the strong power of the distance power.

[3-2] Second Basic Design Selection Point DES2

Next, the second basic design selection point DES2 is calculated based on the addition power of each of the right lens and left lens (step S22). First, the second basic design selection point DES2 will be described below.

In the case of a progressive addition lens, the stronger the addition power is, the more aberration is generated, and therefore the blurring of image in the peripheral portion of the distance vision area becomes more severe. Thus, it is considered to select a design leaning to clear type with a wide distance vision area for the user having strong addition power.

DES2 is obtained as follows based on the average value of the inputted addition power of the right lens ADDR and addition power of the left lens ADDL.

$$DES2=\{(ADDR+ADDL)/2-2.0\} \times 5.0$$

In other words, in such a case, when the average value of the addition power of the right lens and addition power of the left lens exceeds a predetermined power, the second basic design selection point is selected so that a basic design distribution group leaning to clear type is selected; while when the average value of the addition power of the right lens and addition power of the left lens is less than the predetermined power, the second basic design selection point is selected so that a basic design distribution group leaning to soft type is selected.

Judgment is made using 2.0 as the threshold of the addition power (as a reference) in this example, however generally the threshold can be set to a value within a range from 1.75 to 2.75, more preferably from 2.0 to 2.5. Further, the threshold (a predetermined power) for selecting the design leaning to soft type and the threshold for selecting the design leaning to clear type may different from each other. To be specific, it is also possible to select the standard type when the addition power is within a certain range, select the clear type when the addition power exceeds a relatively higher threshold of the addition power, and select the soft type when the addition power is less than a relatively lower threshold of the addition power.

By the process described above, the second basic design selection point DES2 is obtained.

[3-3] Third Basic Design Selection Point DES3

Next, the third basic design selection point DES3 is calculated based on the forward tilt angle PA of the progressive addition lens (step S23). First, the third basic design selection point DES3 will be described below. When the forward tilt angle of the progressive addition lens becomes large, the distance between the upper portion of the lens and the eye will increase, and conversely the distance between the lower portion of the lens and the eye will decrease. This means that, since the distance between the distance vision area arranged in the upper portion of the lens and the eye increases, the blurring of image in the peripheral portion of the distance vision area is seen in a direction closer to the center of the view. Thus, it is preferred to select a design leaning to clear type with a wide distance vision area as the forward tilt angle becomes large.

DES3 is obtained as follows based on the predicted forward tilt angle PA of the lens in a state where the spectacles is completed.

$$DES3=PA-7.0$$

In other words, in such a case, when the forward tilt angle of the progressive addition lens exceeds a predetermined angle, the third basic design selection point is selected so that a basic design distribution group leaning to clear type is selected, while when the forward tilt angle of the progressive addition lens is less than the predetermined angle, the third basic design selection point is selected so that a basic design distribution group leaning to soft type is selected.

Here, an average forward tilt angle of "7.0°" is used as the threshold as a reference, however generally a forward tilt angle within a range of "6° to 8°" can be used to make decision taking into consideration the power and the like of the user. Typically, the forward tilt angle is selected from a range of "6.5° to 7.5°". In such a case, the threshold (a predetermined forward tilt angle) for selecting the design leaning to soft type and the threshold for selecting the design leaning to clear type may different from each other.

[3-4] Fourth Basic Design Selection Point DES4

Next, the fourth basic design selection point DES2 is calculated based on the distance between the vertex of the rear surface of the right lens and the vertex of the cornea of the right eye VDR, and the distance between the vertex of the rear surface of the left lens and the vertex of the cornea of the left eye VDL (step S24). The fourth basic design selection point DES4 calculated in step S24 will be described below.

When the distance between the vertex of the rear surface of the progressive addition lens and vertex of the cornea increases, the distance between the entire lens and the eye will increase. This means that, since the distance between the distance vision area arranged in the upper portion of the lens and the eye increases, the blurring of image in the peripheral portion of the distance vision area is seen in a direction closer to the center of the view, and therefore a design leaning to clear type with a wide distance vision area will be selected when the distance between the vertex of the rear surface of the progressive addition lens and vertex of the cornea becomes large.

An average vertex-to-vertex distance MVD is obtained based on the predicted distance between the vertex of the rear surface of the right lens and the vertex of the cornea of the right eye VDR and the predicted distance between the vertex of the rear surface of the left lens and the vertex of the cornea of the left eye VDL in a state where the spectacles is completed, and DES4 is obtained as follows based on the obtained MVD.

$$MVD=(VDR+VDL)/2$$

When $$MVD \geq 14.5$$

then $$DES4=(MVD-14.5) \times 5.0$$

And when $$MVD<14.5$$

then $$DES4=0$$

In other words, this example shows a case where, when the distance between the vertex of the rear surface of the right progressive addition lens and the vertex of the cornea of the right eye and the distance between the vertex of the rear surface of the left progressive addition lens and the vertex of the cornea of the left eye exceed a predetermined distance, the fourth basic design selection point is selected so that a basic design distribution group leaning to clear type is selected.

Here, the judgment is made using a vertex-to-vertex distance of "14.5 mm" as the predetermined distance, however generally the threshold can be set to a value within a range of "12 mm to 15 mm".

This threshold may be adjusted according to the assumption of typical face form and wearing state of the spectacles based on the major races account for the customers to whom the products are to be marketed. The nose bridge of the Japanese people is not very high, and the eyes of the Japanese people are not deeply sculpted. On the other hand, since the nose bridge of the western people is high and the eyes of the western people are deeply sculpted, the distance between the vertex of the rear surface of the lens and the vertex of the cornea of the eye of the western people trends to be long.

It is possible to assume that the distance between the vertex of the rear surface of the lens and the vertex of the cornea of the eye is typically within a range of "14 mm to 15 mm" for the western people and within a range of "12 mm to 13 mm" for the East Asia people.

[3-5] Fifth Basic Design Selection Point DES5

Further, the fifth basic design selection point DES5 is calculated based on degree of importance of each of the life scenes A1 to A6, B1 to B6, and C1 to C6 (step S25).

The fifth basic design selection point DES5 is selected based on the life scenes important to the user, and why such a basic design selection point is adopted is because the life scenes important to the user are also important points for selecting the basic design of the progressive addition lens.

For example, a design leaning to soft type will be selected in the case where the user uses the spectacles indoor with less chance to take a wide view of distant objects, a design leaning to clear type will be selected in the case where the user uses the spectacles outdoor with much chance to take a wide view of distant objects, and a standard type design will be selected in the case where the balanced life scenes (where both the indoor and outdoor activities are important) are important to the user.

DES5 is obtained as follows based on the each inputted degree of importance of life scenes important to the user A1 to A6, B1 to B6, and C1 to C6.

$$ST=(A1+A2+A3+A4+A5+A6)-6$$

$$BT=(B1+B2+B3+B4+B5+B6)-6$$

$$CT=(C1+C2+C3+C4+C5+C6)-6$$

$$\Delta CS=CT-ST$$

$$DES5=(\Delta CS \times \Delta CS/(|\Delta CS|+BT)) \times 15.0/24.0$$

Here, the fifth basic design selection point is selected so that a basic design distribution group leaning to soft type is selected in the case where the user has relatively long time for indoor life or has relatively short time to take a wide view of distant objects, and a basic design distribution group leaning to clear type is selected in the case where the user has relatively long time for outdoor life or has relatively much chance to take a wide view of distant objects.

[3-6] Sixth Basic Design Selection Point DES6

Next, the sixth basic design selection point DES6 is calculated based on the degree of importance of distance vision to the user (step S26). The sixth basic design selection point DES6 calculated in step S26 will be described below. Since the spectacles store may give their clear intention on what progressive addition lens design is suitable for the user based on the communication between the spectacles store and the user and the experience of the spectacles store on making the spectacles for the user until now, the following is taken into consideration.

DES6 is obtained based on the degree of importance of distance vision FWT inputted based on the intention of the side of the spectacles store.

$$DES6=(FWT/100) \times 15.0$$

[3-7] Seventh Basic Design Selection Point DES7

Next, the seventh basic design selection point DES7 is calculated based on the type information KBtp of the lens kind of the last-used spectacles (step S27).

The seventh basic design selection point DES7 calculated in step S27 is selected in the case where the last-used lens of the user is a progressive addition lens. The seventh basic design selection point DES7 will be described below.

In the case where the user has been using the progressive addition lens, the user will be well used to the progressive addition lens he (or she) has been using. Further, in the case where the user's degree of satisfaction with the progressive addition lens he (or she) has been using is high, the user will be prone to becoming dissatisfied with a progressive addition lens having different sight in the distance vision area. Thus, in the case where the user is satisfied with the progressive addition lens he (or she) has been using, a design having the similar blurring of image caused by the aberration of the peripheral portion of the distance vision area will be selected.

Incidentally, in the case where the user has been using the progressive addition lens, when the prescription information of the last-used spectacle lens is inputted, the basic design will be selected taking into consideration the difference between the distance power of the last-used spectacles and the distance power of the spectacles to be newly created. In the case where the distance power of the new spectacles is changed to a power more leaning to negative than the distance power of the last-used spectacles, since the distance power of the new spectacles becomes the power more leaning to negative, the distance vision area of the new spectacles will be relatively more clearly viewable compared with the distance vision area of the last-used spectacles, even in the case where the same basic design is selected. In such a case, no problem is caused by power difference between the new spectacles and the old spectacles.

In the case where the distance power of the new spectacles is changed to a power more leaning to positive than the distance power of the last-used spectacles, since the distance power of the new spectacles becomes the power more leaning to positive, the distance vision area of the new spectacles will be relatively narrow compared with the distance vision area of the last-used spectacles, even in the case where the same basic design is selected. In the latter case (i.e., in the case where the distance power of the new spectacles is changed to a power more leaning to positive), a design leaning to clear type with a wide distance vision area will be selected.

Further, in the case where the last-used spectacle lens is a multifocal lens (such as a bifocal lens or the like), since the user may be concerned about the blurring of image in the peripheral portion of the distance vision area of the progressive addition lens in many cases, a design leaning to clear type with a wide distance vision area will be selected.

DES7 is obtained as follows based on KBtp which expresses whether the last-used spectacle lens is a progressive addition lens, a multifocal lens, or a single-vision lens.

When

KBtp=1, and SAT=1 or 2 (i.e., when the last-used spectacle lens is a progressive addition lens, and the user is satisfied with the last-used progressive addition lens), then CURD=DEStp−2

CURD is an index of the type of the last-used spectacles. As shown in table 6, CURD is "−1" in the case where the last-used spectacles is the soft type, CURD is "0" in the case where the last-used spectacles is the standard type, and CURD is "1" in the case where the last-used spectacles is the clear type.

Incidentally, in the case where the prescription information of the last-used spectacle lens of the user is inputted, MPW$p$={(SPHpR+CYLpR/2)+(SPHpL+CYLpL/2)}/2

DPW for considering the difference of the average distance powers between the new spectacles and the old spectacles is obtained as follows based on the difference between MPWp and MPW obtained before.

DPW0=MPW−MPW$p$

When

DPW0>0 then

DPW=5

When

DPW0≤0 then

DPW=0

Further, when the prescription information of the last-used spectacle lens of the user is not inputted,

DPW=0

At this time,

DES7=(CURD×12.5)×(3−SAT)+DPW

In other words, DES7 is a value obtained by multiplying CURD (which is a positive value, a negative value, or zero for indicating whether the spectacles is the soft type, the standard type, or the clear type) by the degree of satisfaction to obtain a product, and adding DPW (which is for considering the difference of the average distance powers between the new spectacles and the old spectacles) to the product.

In other words, in this example, the seventh basic design selection point is selected so that in the case where the last-used spectacle lens of the user is a progressive addition lens and where the degree of satisfaction of the user with the progressive addition lens is high, a basic design distribution group leaning to soft type is selected if the last-used spectacle lens is a soft type, and a basic design distribution group leaning to clear type is selected if the last-used spectacle lens is a clear type.

Herein, when

KBtp=1, and SAT>2 (i.e., when the last-used spectacle lenses are progressive addition lenses, but the user is dissatisfied, more or less, with the last-used progressive addition lens), then

DES7=0

Further, when

KBtp=2 (i.e., when the last-used spectacle lens is not a progressive addition lens, but a multifocal lens), then

DES7=15.0

In such a case, the seventh basic design selection point is selected so that the point of the clear type is high.

Further, when

KBtp=0 (i.e., when the last-used spectacle lens is neither a progressive addition lens nor a multifocal lens), then

DES7=0

In such a case, the seventh basic design selection point is selected so that point is not given to both the soft type and the clear type (i.e., so that the standard type is selected).

In the above manner, the seventh basic design selection point DES7 can be selected.

[3-8] Steps for Selecting Basic Design Distribution Group

Finally, the basic design selection point DES is calculated based on DES1 to DES7 obtained in steps S21 to S27, the design type DEStp of the last-used spectacle lens, and the degree of satisfaction SAT with the last-used spectacle lens in the case where the last-used spectacle lens is a progressive addition lens (step S28).

The basic design selection point DES is obtained as follows based on DES1 to DES7 and CURD obtained in the aforesaid manner and the input data SAT of the degree of satisfaction with the last-used spectacle lens, and the design suitable for the user is determined based on the value of DES.

DES$TT$=DES1+DES2+DES3+DES4+DES5+DES6+DES7)

Herein, for example, when

CURD=0, and SAT=1 or 2 then

DES=DES$TT$/(5-SAT)/2

Further, when

CURD≠0, or SAT>2 then

DES=DES$TT$

Herein, when DES<−20, it is determined that the basic design suitable for the user is a basic design leaning to soft type.

On the other hand, when −20≤DES≤+20, it is determined that the basic design suitable for the user is a standard type basic design.

Further, when DES>+20, it is determined that the basic design suitable for the user is a basic design group leaning to clear type.

In such a manner, the basic design suitable for the user is determined based on DES.

Incidentally, in the case where the last-used spectacle lens is not a progressive addition lens (i.e., in the case where the spectacle lens to be manufactured is the first progressive addition lens for the user), the basic design selection point is selected as follows.

DES$TT$=DES1+DES2+DES3+DES4+DES5+DES6+DES7

DES=DES$TT$

Herein, when DES<−20, it is determined that the basic design suitable for the user is a basic design leaning to soft type.

On the other hand, when −20≤DES≤+20, it is determined that the basic design suitable for the user is a standard type basic design.

Further, when DES>+20, it is determined that the basic design suitable for the user is a basic design group leaning to clear type.

In such a manner, the basic design suitable for the user is determined based on DES.

[4] Steps for Selecting Corridor Length

Next, steps for selecting the corridor length will be described below with reference to the flowchart of FIG. 15.

The corridor length is selected by obtaining COR1 to COR5 based on the following calculating formula, obtaining the corridor length selection point COR based on the obtained COR1 to COR5 and values obtained during the process for obtaining COR1 to COR5, and determining the corridor length based on the value of COR.

When the value of each of COR1 to COR5 and COR is negative, it means that the user is suitable for a short corridor length, while when the value of each of COR1 to COR5 and COR is positive, it means that the user is suitable for a long corridor length.

[4-1] First Corridor Length Selection Point COR1

First, the first corridor length selection point COR1 is calculated based on the average value MPW (step S29), wherein the average value MPW is obtained based on the average power of each of the right and left lenses, and the average power of each of the right and left lenses is obtained from the distance power (i.e., the distance spherical power SPH, the cylindrical power CYL and the cylinder axis direction AX) of each of the right and left lenses. The first corridor length selection point COR1 is a corridor length selection point selected based on the average value of the power of the right lens and the power of the left lens.

When the user wears the spectacles to view near objects, the eye of the user will rotate downward. The rotation angle of the eye actually changes depending on the power of the spectacle lens. To be specific, the rotation angle of the eye is larger in the case where the power of the spectacle lens is positive than in the case where the power of the spectacle lens is negative. Further, it is known that, in the case where the power of the spectacle lens is positive, the stronger the power is, the larger the rotation angle of the eye is; while in the case where the power of the spectacle lens is negative, the stronger the power is, the smaller the rotation angle of the eye is. If the above knowledge is applied to the user of the progressive addition lens, it can be known that, in the case where the distance power is positive, the stronger the distance power is, the larger the downward rotation angle of the eye is when the user views near objects, while in the case where the distance power is negative, the stronger the distance power is, the smaller the downward rotation angle of the eye is. It is known from the wearing tests of the progressive addition lens performed so far that, there is a trend to select a design leaning to clear type with a wide distance vision area for the user having weak distance power, regardless of whether the distance power of the progressive addition lens is positive or negative.

Further, the longer the corridor length of the progressive addition lens is, the more severe the blurring of image in the peripheral portion of the distance vision area is; the shorter the corridor length of the progressive addition lens is, the less severe the blurring of image in the peripheral portion of the distance vision area is. Thus, it is considered that, when selecting the corridor length of the progressive addition lens based on whether the distance power is positive or negative and the strength of the distance power, a long corridor length design will be selected for the user whose distance power is within a range from weak power to negative power, and a short corridor length design will be selected for the user whose distance power is negative.

The average power of each of the right and left lenses is obtained based on the inputted distance power of each of the right and left lenses of the user, and the average value MPW of the average power of the right lens and left lens is obtained, and the COR1 is obtained as follows based on the average value MPW.

$$MPW=\{(SPHR+CYLR/2)+(SPHL+CYLL/2)\}/2$$

Herein, when $$MPW<+4.00$$

then $$COR1=(MPW+2)\times1.5$$

While when $$MPW\geq+4.00$$

then $$COR1=6.0$$

In other words, this case represents an example in which the first corridor length selection point is selected by selecting a corridor length shorter than the standard corridor length when MPW is less than a predetermined power, and selecting a corridor length longer than the standard corridor length when MPW is equal to or higher than the predetermined power.

Incidentally, in this example, the judgment is made by setting the MPW for dividing cases to "+4.00" and setting the threshold to "−2.0", the reference numerical values are not limited to these values. For example, the MPW for dividing cases may also be set to a value within a range of "+3 to +5", and the threshold may be set to a value preferably within a range of "1.75 to 2.75", more preferably within a range of "2.0 to 2.5".

[4-2] Second Corridor Length Selection Point COR2

Next, vertical component power of each of the right lens and left lens is obtained based on the distance power of each of the right lens and left lens, and the second corridor length selection point COR2 is calculated based on the difference between the vertical distance power of the right lens and vertical distance power of the left lens (step S30). The second corridor length selection point COR2 calculated in step S30 will be described below.

If the power of the right lens and the power of the left lens of the progressive addition lens are different from each other, when viewing near objects through around the near portion of the lens, a prism difference between the right lens and the left lens will be caused, and the spectacles will be difficult to use if the prism difference is large. At this time, if the corridor length of the progressive addition lens is short, since the prism difference when viewing through around the near portion of the lens becomes small, the spectacles will be easy to use. Thus, a short corridor length will be selected in the case where the difference of vertical power between the right lens and left lens is large.

The vertical component power of each of the right lens and left lens is obtained based on the inputted distance power of each of the right lens and left lens of the user, and the difference DPWV between the vertical component power of the right lens and the vertical component power of the left lens is obtained, and COR2 is obtained as follows based on the difference between the vertical component power of the right lens and the vertical component power of the left lens.

$$PWVR=SPHR+CYLR\times SIN^2(|AXR-90|\times\pi/180)$$

$$PWVL=SPHL+CYLL\times SIN^2(|AXR-90|\times\pi/180)$$

$$DPWV=|PWVR-PWVL|$$

$$COR2=-1.0\times DPWV\times4.0$$

In such a case, the second corridor length selection point is selected so that the larger the difference of vertical distance power between the right lens and left lens than a predetermined power, the relatively shorter corridor length is selected.

[4-3] Third Corridor Length Selection Point COR3

Next, the third corridor length selection point COR3 is calculated based on the vertex-to-vertex distance (i.e., the distance between the vertex of the rear surface of the right lens and the vertex of the cornea of the right eye VDR, and the distance between the vertex of the rear surface of the left lens and the vertex of the cornea of the left eye VDL) (step S31).

When the distance between the vertex of the rear surface of the progressive addition lens and vertex of the cornea increases, the distance between the entire lens and the eye will increase. This means that, since the distance between the distance vision area arranged in the upper portion of the lens and the eye increases, the blurring of image in the peripheral portion of the distance vision area is seen in a direction closer to the center of the view, and therefore a long corridor length with less aberration and wider distance vision area will be selected as the distance between the vertex of the rear surface of the progressive addition lens and vertex of the cornea becomes large.

In contrast, when the distance between the vertex of the rear surface of the progressive addition lens and vertex of the cornea decreases, the distance between the entire lens and the eye will decrease. This means that, since the near vision area arranged in the lower portion of the lens is seen in a lower position by the eye, the eye needs to be largely rotated downwardly when viewing near objects and therefore it is harder to view near objects, so that a short corridor length design capable of viewing near objects with less downward rotation of the eye will be selected as the distance between the vertex of the rear surface of the progressive addition lens and vertex of the cornea becomes small.

The third corridor length selection point COR3 is obtained as follows based on the predicted distance between the vertex of the rear surface of the right lens and the vertex of the cornea of the right eye VDR and the predicted distance between the vertex of the rear surface of the left lens and the vertex of the cornea of the left eye VDL in a state where the spectacles is completed.

$$MVD=(VDR+VDL)/2$$

$$COR3=(MVD-14.5)\times4.0$$

In other words, in such a case, the third basic design selection point is selected by selecting a basic design distribution group leaning to clear type when the distance between the vertex of the rear surface of the progressive addition lens and vertex of the cornea exceeds a predetermined distance, and selecting a long corridor length design when the distance between the vertex of the rear surface of the progressive addition lens and vertex of the cornea exceed a predetermined angle.

Incidentally, as the predetermined distance, an average value 14.5 mm of the distance between the vertex of the rear surface of the progressive addition lens and vertex of the cornea is set as a threshold in this case, however the distance as the threshold is not limited to such a value. Generally, the threshold may be set to a value within a range of "12 mm to 15 mm".

This threshold may be adjusted according to the assumption of typical face form and wearing state of the spectacles based on the major races account for the customers to whom the products are to be marketed. The nose bridge of the Japanese people is not very high, and the eyes of the Japanese people are not deeply sculpted. On the other hand, since the nose bridge of the western people is high and the eyes of the western people are deeply sculpted, the distance between the vertex of the rear surface of the lens and the vertex of the cornea of the eye of the western people trends to be long.

It is possible to assume that the distance between the vertex of the rear surface of the lens and the vertex of the cornea of the eye is typically within a range of "14 mm to 15 mm" for the western people and within a range of "12 mm to 13 mm" for the East Asia people.

[4-4] Fourth Corridor Length Selection Point COR4

Next, the addition power difference $\Delta ADD$ of each of the right lens and left lens with the addition power of the last-used progressive addition lens as a reference is obtained, and the fourth corridor length selection point COR4 is calculated (step S32).

Here, in the case where the last-used spectacle lens of the user is a progressive addition lens, the fourth corridor length selection point COR4 selected based on the vertex-to-vertex distance difference between the right lens and left lens will be described below.

When newly manufacturing a progressive addition lens, if the addition power is significantly increased compared with the last-used progressive addition lens, the aberration of the progressive addition lens will significantly increase. Further, in the case of the progressive addition lens, the shorter corridor length will have severer aberration. Thus, in the case where the addition power is significantly increased compared with the last-used progressive addition lens, it is preferred not to select a design having a corridor length shorter than that of the last-used progressive addition lens.

The addition power difference of the right lens $\Delta ADDR$ and the addition power difference of the left lens $\Delta ADDL$, with the addition power of the last-used progressive addition lens as a reference, are respectively obtained based on the addition power of the right lens and the addition power of the left lens of the newly manufactured progressive addition lens. Further, the fourth corridor length selection point COR4 is obtained as follows based on the addition power differences $\Delta ADDR$ and $\Delta ADDL$.

$$M\Delta ADD = (\Delta ADDR + \Delta ADDL)/2$$

Herein, when $$M\Delta ADD \geq 0.50$$

then the following COR4 will be selected $$COR4 = M\Delta ADD \times 10.0$$

While when $$M\Delta ADD < 0.50$$

then the following COR4 will be selected $$COR4 = 0$$

In other words, this case represents an example in which fourth corridor length selection point is selected by selecting a corridor length longer than the standard corridor length when the addition power differences of the right lens and left lens of the progressive addition lens equal to or higher a predetermined power.

Incidentally, in this example, as the predetermined power, the value 0.5 is set as a threshold; however, since some change might be needed due to other elements such as difference of distance power, the threshold is not limited to such a value. Generally, the threshold may be selected from an addition power difference range of 0.25-1.00, typically from an addition power difference range of 0.25-0.75.

[4-5] Fifth Corridor Length Selection Point COR5

Next, the fifth corridor length selection point COR5 is calculated based on the type information KBtp of the last-used spectacle lens (step S33).

The fifth corridor length selection point COR5 is a corridor length selection point selected based on the lens type and degree of satisfaction of the last-used spectacle lens, if the last-used spectacle lens of the user is a progressive addition lens.

The user will be well used to the design of the last-used spectacle lens. Further, in the case where the user's degree of satisfaction with the last-used spectacle lens is high, the user will be prone to becoming dissatisfied with a progressive addition lens having different corridor length, since the user will fell difficult to view near objects. Thus, in the case where the user is satisfied with the last-used spectacle lens, a design having a corridor length close to the corridor length of the progressive addition lens will be selected.

The fifth corridor length selection point COR5 is obtained as follows based on KBtp which expresses whether the last-used spectacle lens is a progressive addition lens, a multifocal lens, or a single-vision lens.

When

KBtp=1, and SAT=1 or 2 (i.e., when the last-used spectacle lens is a progressive addition lens, and the user is satisfied with the last-used progressive addition lens), then $$CURC = CORtp - 3$$

$$COR5 = (CURC \times 3.125) \times (5 - SAT)$$

When

KBtp=1, and SAT>2 then $$COR5 = 0$$

Further, when

KBtp=2 (i.e., when the last-used spectacle lens is a multifocal lens), then $$COR5 = -35.0$$

Further, when

KBtp=0 (i.e., when the last-used spectacle lens is an other lens), then $$COR5 = 0$$

In such a case, the fifth corridor length selection point is selected so that a corridor length close to the corridor length of the last-used progressive addition lens will be selected in the case where the last-used spectacle lens of the user is a progressive addition lens and where the degree of satisfaction of the user with the progressive addition lens is high. Further, in the case where the last-used spectacle lens is a multifocal lens, weight is determined so that a corridor length shorter than the standard corridor length is selected; while in the case where the last-used spectacle lens is neither a progressive addition lens nor a multifocal lens, weight is determined so that a standard corridor length is selected.

[4-6] Corridor Length Possibility Index

Next, FH14 and FH16 which indicate whether the corridor length 14 mm and the corridor length 16 mm can be used are calculated (step S34). The FH14 and FH16 calculated in step S34 will be described below.

First, whether or not a type having a relatively long corridor length can be designed based on the longitudinal size Ssz of the frame and the height of the right and left fitting points EPR, EPL is expressed by a corridor length possibility index. Herein FH 16 and FH14, as values expressing whether or not the corridor length 16 mm and corridor length 14 mm can be used respectively, are obtained as follows.

FH 16 and FH14 respectively express whether or not the center of the near vision power measurement point of the progressive addition lens having the corridor length 16 mm and the center of the near vision power measurement point of the progressive addition lens having the corridor length 14 mm barely fall into the lower end of the rims of the frame, and it means that the center of the near vision power measurement point fails to fall into the lower end of the rims if the value of each of the FH 16 and FH14 is negative.

$$MEP=(EPR+EPL)/2$$

$$MFH=MEP+Bsz/2$$

$$FH16=MFH-20$$

$$FH14=MFH-18$$

[4-7] Steps for Selecting Corridor Length

Further, the corridor length selection point COR is calculated based on COR1 to COR5, the corridor length type CORtp of the last-used spectacle lens, FH16 and FH14, and the degree of satisfaction SAT of the last-used progressive addition lens (step S35). The corridor length suitable for the user is determined based on the value of the corridor length selection point COR calculated in step S35.

$$COR\mathit{TT}=COR1+COR2+COR3+COR4+COR5$$

Here, there are the following three cases (1) to (3).
(1) When
FH14<0 (i.e., when the corridor length 14 mm or longer can not be used),
then $$COR=-25.0$$

(2) When
FH14≥0, and FH16<0 (i.e., when the corridor length 14 mm can be used but the corridor length 16 can not be used), and CORTT>20
then $$COR=0$$

(3) In the other cases than the aforesaid cases (1) and (2), when $$CURC=0, \text{ and } SAT=1 \text{ or } 2$$

then $$COR=COR\mathit{TT}/(5-SAT)/2$$

In the other cases than the aforesaid cases (1), (2) and (3), $$COR=COR\mathit{TT}$$

Further, when COR<−20, it is determined that the corridor length suitable for the user is 11 mm.
Further, when −20≤COR≤+20, it is determined that the corridor length suitable for the user is 14 mm.
Further, when COR>+20, it is determined that the corridor length suitable for the user is 16 mm.

In such a manner, the corridor length suitable for the user is determined based on the corridor length selection point COR.

Incidentally, in the case where the last-used spectacle lens is not a progressive addition lens, the corridor length selection point COR is obtained as follows.

$$COR\mathit{TT}=COR1+COR2+COR3+COR4+COR5$$

Here, there are the following two cases (4) and (5).
(4) When
FH14<0 (i.e., when the corridor length 14 mm or longer can not be used),
then $$COR=-25.0$$

(5) When
FH14≥0, and FH16<0 (i.e., when the corridor length 14 mm can be used but the corridor length 16 can not be used), and CORTT>20
then $$COR=0$$

In the other cases than aforesaid cases (4) and (5), $$COR=COR\mathit{TT}$$

Further, when COR<−20, it is determined that the corridor length suitable for the user is 11 mm.
Further, when −20≤COR≤+20, it is determined that the corridor length suitable for the user is 14 mm.
Further, when COR>+20, it is determined that the corridor length suitable for the user is 16 mm.

In such a manner, the corridor length suitable for the user is determined based on the corridor length selection point COR.

[5] Steps for Selecting Lens Design Standard

Finally, the basic design distribution group and corridor length suitable for the user are selected based on the basic design selection point DES and corridor length selection point COR to finally determine the lens design standard (step S36), and thereby the process for selecting lens design standard is completed.

As described above, the basic design selection point DES and corridor length selection point COR are obtained, and base on which the basic design distribution group and corridor length of the progressive addition lens suitable for the user are selected, and thereby a lens design standard shown as one pattern is selected from the patterns shown as (a) to (i) of FIG. 1, wherein each pattern shows the aberration distribution and average power distribution of a basic design distribution example. Further, based on the lens design standard, which is indicated by the basic design distribution group and the corridor length, a final optical design is made to meet the prescription power and physical features of the user, and the progressive addition lens pair suitable for the use conditions and prescription power of the user is completed.

Incidentally, it is possible to create software and allow the spectacles store to install the software on their personal computer so that a sequence of processes for performed the aforesaid selections (i.e., calculations) can be executed by the personal computer. Further, it is also possible for the spectacles store to send information inputted from their personal computer to a server of the lens manufacturer via the Internet to cause the software to operate in the server, so that the selected basic design and corridor length of the progressive addition lens suitable for the user are displayed on the personal computer of the spectacles store.

In the method for selecting lens design standard according to the aforesaid embodiment of the present invention, in addition to the visual environment information of the user such as career and hobby of the user, other elements are considered.

First, for selecting the basic design distribution group, the elements to be considered include: whether the distance power is positive or negative, the strength of the distance power, the strength of the addition power, the forward tilt angle of the lens, the distance between the vertex of the rear surface of the lens and vertex of the cornea, and the like. Further, the following conditions are also incorporated as the elements: whether the last-used spectacle lens is a progressive addition lens, a multifocal lens, or a single-vision lens, or whether the user has never used spectacles before. In addition to the above elements, the controlling values (as parameters) indicating the following items are also incorporated as the arithmetic elements: the design type of the last-used progressive addition lens in the case where the last-used spectacle lens is a progressive addition lens, the life scenes important to the user and the degree of importance thereof, and the degree of importance of distance vision inputted based on the intention of the side of the spectacles store.

On the other hand, for selecting the corridor length, the elements to be considered include: whether the distance power is positive or negative, the strength of the distance power, the longitudinal size of the frame and the height of the fitting point of the progressive addition lens, the distance between the vertex of the rear surface of the lens and vertex of the cornea, and the like. Further, the following conditions are also added as the elements: whether the last-used spectacle lens is a progressive addition lens, a multifocal lens, or other lens. Further, in the case where the spectacle lens having been used is a progressive addition lens, the difference between the addition power of the ordered lens and the addition power of the progressive addition lens having been used is also treated as an element. Similarly, in the case where the last-used spectacle lens is a progressive addition lens, the corridor length type of the progressive addition lens is also obtained as a parameter by performing calculation. Thus, it becomes ever more possible to select the basic design and corridor length suitable for individual users.

It should be understood that the present invention is not limited to the arrangement described in the aforesaid embodiment, but includes various modifications and variations without departing from the spirit of the present invention.

EXPLANATION OF REFERENCE NUMERALS 1 eye
1L left eye
1R right eye
2 lens
2L left lens
2R right lens
3 frame
3L left rim
3R right rim

The invention claimed is:

1. A lens design standard selecting method to select a lens design standard from a basic design distribution group and a corridor length, the basic design distribution group determining a distribution of a distance vision area and a near vision area of a progressive addition lens pair, the method comprising:

preparing lens design standard variations that include a plurality of basic design distribution groups different from each other in area-division between the distance vision area and the near vision area, and a plurality of corridor lengths different from each other;

a parameter setting step of inputting parameters originating from at least: prescription information of a user who uses the progressive addition lens pair, life environmental information of the user, and frame shape information of a frame for holding the progressive addition lens pair;

selecting a basic design distribution group from the plurality of basic design distribution groups based on the inputted parameters;

selecting a corridor length from the plurality of corridor lengths based on the inputted parameters; and selecting a lens design standard which includes the basic design distribution group and the corridor length selected from the plurality of basic design distribution groups and the plurality of corridor length, respectively, from the lens design standard variations, wherein:

in the parameter setting step, a distance between a vertex of a rear surface of a right progressive addition lens and a vertex of a cornea of a right eye and a distance between a vertex of a rear surface of a left progressive addition lens and a vertex of a cornea of a left eye calculated based on the prescription information of the user and the frame shape information in a state where spectacles worn by the user are included into setting elements of the parameters, at least one of the selecting the basic design distribution group, the selecting the corridor length, and the selecting the lens design standard is performed using a computing device, the selecting the basic design distribution group comprises:
obtaining an average distance power for each of the right and left lenses based on a distance power of each of the right and left lenses, and calculating a first basic design selection point based on an average value of the average distance power of the right lens and the average distance power of the left lens;

calculating a second basic design selection point based on an addition power of each of the right and left lenses;

calculating a third basic design selection point based on a forward tilt angle of the progressive addition lens;

calculating a fourth basic design selection point based on the distance between the vertex of the rear surface of the right progressive addition lens and the vertex of the cornea of the right eye and the distance between the vertex of the rear surface of the left progressive addition lens and the vertex of the cornea of the left eye;

calculating a fifth basic design selection point based on a degree of importance of life scenes;

calculating a sixth basic design selection point based on a degree of importance of distance vision; and calculating a basic design selection point based on at least the first to sixth basic design selection points, and in the case where the user has been using spectacle lenses and where a last-used spectacle lens is a progressive addition lens, the parameter setting step further comprises: inputting a lens design standard including the basic design distribution group and a corridor length of the last-used progressive addition lens, and inputting degree of satisfaction with the last-used progressive addition lens, the selecting the basic design distribution group further comprises: calculating a seventh basic design selection point based on the lens design standard of the last-used progressive addition lens, and in the calculating the basic design selection point, the calculation is performed based on the first to seventh basic design selection points, the lens design standard of the last-used progressive addition lens, and the degree of satisfaction with the last-used progressive addition lens.

2. A lens design standard selecting method to select a lens design standard from a basic design distribution group and a corridor length, the basic design distribution group determining a distribution of a distance vision area and a near vision area of a progressive addition lens pair, the method comprising:

preparing lens design standard variations that include a plurality of basic design distribution groups different from each other in area-division between the distance vision area and the near vision area, and a plurality of corridor lengths different from each other;

a parameter setting step of inputting parameters originating from at least: prescription information of a user who uses the progressive addition lens pair, life environmental information of the user, and frame shape information of a frame for holding the progressive addition lens pair;

selecting a basic design distribution group from the plurality of basic design distribution groups based on the inputted parameters;

selecting a corridor length from the plurality of corridor lengths based on the inputted parameters; and selecting a lens design standard which includes the basic design distribution group and the corridor length selected from the plurality of basic design distribution groups and the plurality of corridor length, respectively, from the lens design standard variations, wherein:

in the parameter setting step, a distance between a vertex of a rear surface of a right progressive addition lens and a vertex of a cornea of a right eye and a distance between a vertex of a rear surface of a left progressive addition lens and a vertex of a cornea of a left eye calculated based on the prescription information of the user and the frame shape information in a state where spectacles worn by the user are included into setting elements of the parameters, at least one of the selecting the basic design distribution group, the selecting the corridor length, and the selecting the lens design standard is performed using a computing device, as the basic design distribution group, a standard basic design distribution group, a soft type basic design distribution group, and a clear type basic design distribution group are prepared, the soft type basic design distribution group having narrower distance vision area and less aberration in a lateral portion ranging from an intermediate vision area to the near vision area of the lens than the standard basic design distribution group, the clear type basic design distribution group having wider distance vision area and more aberration in the lateral portion ranging from the intermediate vision area to the near vision area of the lens than the standard basic design distribution group, and as the corridor length, a standard corridor length, a corridor length shorter than the standard corridor length, and a corridor length longer than the standard corridor length are prepared.

3. A lens design standard selecting method to select a lens design standard from a basic design distribution group and a corridor length, the basic design distribution group determining a distribution of a distance vision area and a near vision area of a progressive addition lens pair, the method comprising:

preparing lens design standard variations that include a plurality of basic design distribution groups different from each other in area-division between the distance vision area and the near vision area, and a plurality of corridor lengths different from each other;

a parameter setting step of inputting parameters originating from at least: prescription information of a user who uses the progressive addition lens pair, life environmental information of the user, and frame shape information of a frame for holding the progressive addition lens pair;

selecting a basic design distribution group from the plurality of basic design distribution groups based on the inputted parameters;

selecting a corridor length from the plurality of corridor lengths based on the inputted parameters; and selecting a lens design standard which includes the basic design distribution group and the corridor length selected from the plurality of basic design distribution groups and the plurality of corridor length, respectively, from the lens design standard variations, wherein:

in the parameter setting step, a distance between a vertex of a rear surface of a right progressive addition lens and a vertex of a cornea of a right eye and a distance between a vertex of a rear surface of a left progressive addition lens and a vertex of a cornea of a left eye calculated based on the prescription information of the user and the frame shape information in a state where spectacles worn by the user are included into setting elements of the parameters, at least one of the selecting the basic design distribution group, the selecting the corridor length, and the selecting the lens design standard is performed using a computing device, the selecting the basic design distribution group comprises:

obtaining an average distance power for each of the right and left lenses based on a distance power of each of the right and left lenses, and calculating a first basic design selection point based on an average value of the average distance power of the right lens and the average distance power of the left lens;

calculating a second basic design selection point based on an addition power of each of the right and left lenses;

calculating a third basic design selection point based on a forward tilt angle of the progressive addition lens;

calculating a fourth basic design selection point based on the distance between the vertex of the rear surface of the right progressive addition lens and the vertex of the cornea of the right eye and the distance between the vertex of the rear surface of the left progressive addition lens and the vertex of the cornea of the left eye;

calculating a fifth basic design selection point based on a degree of importance of life scenes; and calculating a basic design selection point based on at least the first to fifth basic design selection points, as the basic design distribution group, a standard basic design distribution group, a soft type basic design distribution group, and a clear type basic design distribution group are prepared, the soft type basic design distribution group having narrower distance vision area and less aberration in a lateral portion ranging from an intermediate vision area to the near vision area of the lens than the standard basic design distribution group, the clear type basic design distribution group having wider distance vision area and more aberration in the lateral portion ranging from the intermediate vision area to the near vision area of the lens than the standard basic design distribution group, when calculating the first basic design selection point, if spherical power of the right lens and spherical power of the left lens are respectively denoted by references SPHR and SPHL and cylindrical power of the right lens and cylindrical power of the left lens are respectively denoted by references CYLR and CYLL, then a distance average power MPW of the right lens and the left lens is obtained as follows:

$$MPW=\{(SPHR+CYLR/2)+(SPHL+CYLL/2)\}/2, \text{ and}$$

the first basic design selection point is selected so that a basic design distribution group leaning to the clear type is selected if MPW is a power equal to or higher than a predetermined negative power.

4. A lens design standard selecting method to select a lens design standard from a basic design distribution group and a corridor length, the basic design distribution group determining a distribution of a distance vision area and a near vision area of a progressive addition lens pair, the method comprising:

preparing lens design standard variations that include a plurality of basic design distribution groups different from each other in area-division between the distance vision area and the near vision area, and a plurality of corridor lengths different from each other;

a parameter setting step of inputting parameters originating from at least: prescription information of a user who uses the progressive addition lens pair, life environmental information of the user, and frame shape information of a frame for holding the progressive addition lens pair;

selecting a basic design distribution group from the plurality of basic design distribution groups based on the inputted parameters;

selecting a corridor length from the plurality of corridor lengths based on the inputted parameters; and selecting a lens design standard which includes the basic design distribution group and the corridor length selected from the plurality of basic design distribution groups and the plurality of corridor length, respectively, from the lens design standard variations, wherein:

in the parameter setting step, a distance between a vertex of a rear surface of a right progressive addition lens and a vertex of a cornea of a right eye and a distance between a vertex of a rear surface of a left progressive addition lens and a vertex of a cornea of a left eye calculated based on the prescription information of the user and the frame shape information in a state where spectacles worn by the user are included into setting elements of the parameters, at least one of the selecting the basic design distribution group, the selecting the corridor length, and the selecting the lens design standard is performed using a computing device, the selecting the basic design distribution group comprises:
obtaining an average distance power for each of the right and left lenses based on a distance power of each of the right and left lenses, and calculating a first basic design selection point based on an average value of the average distance power of the right lens and the average distance power of the left lens;

calculating a second basic design selection point based on an addition power of each of the right and left lenses;

calculating a third basic design selection point based on a forward tilt angle of the progressive addition lens;

calculating a fourth basic design selection point based on the distance between the vertex of the rear surface of the right progressive addition lens and the vertex of the cornea of the right eye and the distance between the vertex of the rear surface of the left progressive addition lens and the vertex of the cornea of the left eye;

calculating a fifth basic design selection point based on a degree of importance of life scenes; and calculating a basic design selection point based on at least the first to fifth basic design selection points, as the basic design distribution group, a standard basic design distribution group, a soft type basic design distribution group, and a clear type basic design distribution group are prepared, the soft type basic design distribution group having narrower distance vision area and less aberration in a lateral portion ranging from an intermediate vision area to the near vision area of the lens than the standard basic design distribution group, the clear type basic design distribution group having wider distance vision area and more aberration in the lateral portion ranging from the intermediate vision area to the near vision area of the lens than the standard basic design distribution group, and when calculating the second basic design selection point, if the average of the addition power of the right lens and the addition power of the left lens exceeds a predetermined power, the second basic design selection point is selected so that a basic design distribution group leaning to the clear type is selected; while if the average of the addition power of the right lens and the addition power of the left lens is less than the predetermined power, the second basic design selection point is selected so that a basic design distribution group leaning to the soft type is selected.

5. A lens design standard selecting method to select a lens design standard from a basic design distribution group and a corridor length, the basic design distribution group determining a distribution of a distance vision area and a near vision area of a progressive addition lens pair, the method comprising:

preparing lens design standard variations that include a plurality of basic design distribution groups different from each other in area-division between the distance vision area and the near vision area, and a plurality of corridor lengths different from each other;

a parameter setting step of inputting parameters originating from at least: prescription information of a user who uses the progressive addition lens pair, life environmental information of the user, and frame shape information of a frame for holding the progressive addition lens pair;

selecting a basic design distribution group from the plurality of basic design distribution groups based on the inputted parameters;

selecting a corridor length from the plurality of corridor lengths based on the inputted parameters; and selecting a lens design standard which includes the basic design distribution group and the corridor length selected from the plurality of basic design distribution groups and the plurality of corridor length, respectively, from the lens design standard variations, wherein:

in the parameter setting step, a distance between a vertex of a rear surface of a right progressive addition lens and a vertex of a cornea of a right eye and a distance between a vertex of a rear surface of a left progressive addition lens and a vertex of a cornea of a left eye calculated based on the prescription information of the user and the frame shape information in a state where spectacles worn by the user are included into setting elements of the parameters, at least one of the selecting the basic design distribution group, the selecting the corridor length, and the selecting the lens design standard is performed using a computing device, the selecting the basic design distribution group comprises:
obtaining an average distance power for each of the right and left lenses based on a distance power of each of the right and left lenses, and calculating a first basic design selection point based on an average value of the average distance power of the right lens and the average distance power of the left lens;
calculating a second basic design selection point based on an addition power of each of the right and left lenses;
calculating a third basic design selection point based on a forward tilt angle of the progressive addition lens;
calculating a fourth basic design selection point based on the distance between the vertex of the rear surface of the right progressive addition lens and the vertex of the cornea of the right eye and the distance between the vertex of the rear surface of the left progressive addition lens and the vertex of the cornea of the left eye,
calculating a fifth basic design selection point based on a degree of importance of life scenes, and
calculating a basic design selection point based on at least the first to fifth basic design selection points, as the basic design distribution group, a standard basic design distribution group, a soft type basic design distribution group, and a clear type basic design distribution group are prepared, the soft type basic design distribution group having narrower distance vision area and less aberration in a lateral portion ranging from an intermediate vision area to the near vision area of the lens than the standard basic design distribution group, the clear type basic design distribution group having wider distance vision area and more aberration in the lateral portion ranging from the intermediate vision area to the near vision area of the lens than the standard basic design distribution group, and when calculating the third basic design selection point, if the forward tilt angle of the progressive addition lens exceeds a predetermined angle, the third basic design selection point is selected so that a basic design distribution group leaning to the clear type is selected; while if the forward tilt angle of the progressive addition lens is less than the predetermined angle, the third basic design selection point is selected so that a basic design distribution group leaning to the soft type is selected.

6. A lens design standard selecting method to select a lens design standard from a basic design distribution group and a corridor length, the basic design distribution group determining a distribution of a distance vision area and a near vision area of a progressive addition lens pair, the method comprising:
preparing lens design standard variations that include a plurality of basic design distribution groups different from each other in area-division between the distance vision area and the near vision area, and a plurality of corridor lengths different from each other;
a parameter setting step of inputting parameters originating from at least: prescription information of a user who uses the progressive addition lens pair, life environmental information of the user, and frame shape information of a frame for holding the progressive addition lens pair;
selecting a basic design distribution group from the plurality of basic design distribution groups based on the inputted parameters;
selecting a corridor length from the plurality of corridor lengths based on the inputted parameters; and
selecting a lens design standard which includes the basic design distribution group and the corridor length selected from the plurality of basic design distribution groups and the plurality of corridor length, respectively, from the lens design standard variations, wherein:

in the parameter setting step, a distance between a vertex of a rear surface of a right progressive addition lens and a vertex of a cornea of a right eye and a distance between a vertex of a rear surface of a left progressive addition lens and a vertex of a cornea of a left eye calculated based on the prescription information of the user and the frame shape information in a state where spectacles worn by the user are included into setting elements of the parameters, at least one of the selecting the basic design distribution group, the selecting the corridor length, and the selecting the lens design standard is performed using a computing device, the selecting the basic design distribution group comprises:
obtaining an average distance power for each of the right and left lenses based on a distance power of each of the right and left lenses, and calculating a first basic design selection point based on an average value of the average distance power of the right lens and the average distance power of the left lens;
calculating a second basic design selection point based on an addition power of each of the right and left lenses;
calculating a third basic design selection point based on a forward tilt angle of the progressive addition lens;
calculating a fourth basic design selection point based on the distance between the vertex of the rear surface of the right progressive addition lens and the vertex of the cornea of the right eye and the distance between the vertex of the rear surface of the left progressive addition lens and the vertex of the cornea of the left eye;
calculating a fifth basic design selection point based on a degree of importance of life scenes; and
calculating a basic design selection point based on at least the first to fifth basic design selection points, as the basic design distribution group, a standard basic design distribution group, a soft type basic design distribution group, and a clear type basic design distribution group are prepared, the soft type basic design distribution group having narrower distance vision area and less aberration in a lateral portion ranging from an intermediate vision area to the near vision area of the lens than the standard basic design distribution group, the clear type basic design distribution group having wider distance vision area and more aberration in the lateral portion ranging from the intermediate vision area to the near vision area of the lens than the standard basic design distribution group, and when calculating the fourth basic design selection point, if the distance between the vertex of the rear surface of the right progressive addition lens and the vertex of the cornea of the right eye and the distance between the vertex of the rear surface of the left progressive addition lens and the vertex of the cornea of the left eye exceed a predetermined distance, the fourth basic design selection point is selected so that a basic design distribution group leaning to the clear type is selected.

7. A lens design standard selecting method to select a lens design standard from a basic design distribution group and a corridor length, the basic design distribution group determining a distribution of a distance vision area and a near vision area of a progressive addition lens pair, the method comprising:

preparing lens design standard variations that include a plurality of basic design distribution groups different from each other in area-division between the distance vision area and the near vision area, and a plurality of corridor lengths different from each other;

a parameter setting step of inputting parameters originating from at least: prescription information of a user who uses the progressive addition lens pair, life environmental information of the user, and frame shape information of a frame for holding the progressive addition lens pair;

selecting a basic design distribution group from the plurality of basic design distribution groups based on the inputted parameters;

selecting a corridor length from the plurality of corridor lengths based on the inputted parameters; and selecting a lens design standard which includes the basic design distribution group and the corridor length selected from the plurality of basic design distribution groups and the plurality of corridor length, respectively, from the lens design standard variations, wherein:

in the parameter setting step, a distance between a vertex of a rear surface of a right progressive addition lens and a vertex of a cornea of a right eye and a distance between a vertex of a rear surface of a left progressive addition lens and a vertex of a cornea of a left eye calculated based on the prescription information of the user and the frame shape information in a state where spectacles worn by the user are included into setting elements of the parameters, at least one of the selecting the basic design distribution group, the selecting the corridor length, and the selecting the lens design standard is performed using a computing device, the selecting the basic design distribution group comprises:

obtaining an average distance power for each of the right and left lenses based on a distance power of each of the right and left lenses, and calculating a first basic design selection point based on an average value of the average distance power of the right lens and the average distance power of the left lens;

calculating a second basic design selection point based on an addition power of each of the right and left lenses;

calculating a third basic design selection point based on a forward tilt angle of the progressive addition lens;

calculating a fourth basic design selection point based on the distance between the vertex of the rear surface of the right progressive addition lens and the vertex of the cornea of the right eye and the distance between the vertex of the rear surface of the left progressive addition lens and the vertex of the cornea of the left eye;

calculating a fifth basic design selection point based on a degree of importance of life scenes; and calculating a basic design selection point based on at least the first to fifth basic design selection points, as the basic design distribution group, a standard basic design distribution group, a soft type basic design distribution group, and a clear type basic design distribution group are prepared, the soft type basic design distribution group having narrower distance vision area and less aberration in a lateral portion ranging from an intermediate vision area to the near vision area of the lens than the standard basic design distribution group, the clear type basic design distribution group having wider distance vision area and more aberration in the lateral portion ranging from the intermediate vision area to the near vision area of the lens than the standard basic design distribution group, and when calculating the fifth basic design selection point, if the user has relatively much time for indoor life or has relatively less time to take a wide view of distant objects, the fifth basic design selection point is selected so that a basic design distribution group leaning to the soft type is selected; while if the user has relatively much time for outdoor life or has relatively much chance to take a wide view of distant objects, the fifth basic design selection point is selected so that a basic design distribution group leaning to the clear type is selected.

8. A lens design standard selecting method to select a lens design standard from a basic design distribution group and a corridor length, the basic design distribution group determining a distribution of a distance vision area and a near vision area of a progressive addition lens pair, the method comprising:

preparing lens design standard variations that include a plurality of basic design distribution groups different from each other in area-division between the distance vision area and the near vision area, and a plurality of corridor lengths different from each other;

a parameter setting step of inputting parameters originating from at least: prescription information of a user who uses the progressive addition lens pair, life environmental information of the user, and frame shape information of a frame for holding the progressive addition lens pair;

selecting a basic design distribution group from the plurality of basic design distribution groups based on the inputted parameters;

selecting a corridor length from the plurality of corridor lengths based on the inputted parameters; and selecting a lens design standard which includes the basic design distribution group and the corridor length selected from the plurality of basic design distribution groups and the plurality of corridor length, respectively, from the lens design standard variations, wherein:

in the parameter setting step, a distance between a vertex of a rear surface of a right progressive addition lens and a vertex of a cornea of a right eye and a distance between a vertex of a rear surface of a left progressive addition lens and a vertex of a cornea of a left eye calculated based on the prescription information of the user and the frame shape information in a state where spectacles worn by the user are included into setting elements of the parameters, at least one of the selecting the basic design distribution group, the selecting the corridor length, and the selecting the lens design standard is performed using a computing device, the selecting the basic design distribution group comprises:
obtaining an average distance power for each of the right and left lenses based on a distance power of each of the right and left lenses, and calculating a first basic design selection point based on an average value of the average distance power of the right lens and the average distance power of the left lens;
calculating a second basic design selection point based on an addition power of each of the right and left lenses;
calculating a third basic design selection point based on a forward tilt angle of the progressive addition lens;
calculating a fourth basic design selection point based on the distance between the vertex of the rear surface of the right progressive addition lens and the vertex of the cornea of the right eye and the distance between the vertex of the rear surface of the left progressive addition lens and the vertex of the cornea of the left eye;
calculating a fifth basic design selection point based on a degree of importance of life scenes;
calculating a sixth basic design selection point based on a degree of importance of distance vision; and
calculating a basic design selection point based on at least the first to sixth basic design selection points,
as the basic design distribution group, a standard basic design distribution group, a soft type basic design distribution group, and a clear type basic design distribution group are prepared, the soft type basic design distribution group having narrower distance vision area and less aberration in a lateral portion ranging from an intermediate vision area to the near vision area of the lens than the standard basic design distribution group, the clear type basic design distribution group having wider distance vision area and more aberration in the lateral portion ranging from the intermediate vision area to the near vision area of the lens than the standard basic design distribution group, and
when calculating the sixth basic design selection point, a spectacles store selects a point which is an index indicating whether the basic design distribution group is a basic design distribution group leaning to the soft type or a basic design distribution group leaning to the clear type.

9. A lens design standard selecting method to select a lens design standard from a basic design distribution group and a corridor length, the basic design distribution group determining a distribution of a distance vision area and a near vision area of a progressive addition lens pair, the method comprising:
preparing lens design standard variations that include a plurality of basic design distribution groups different from each other in area-division between the distance vision area and the near vision area, and a plurality of corridor lengths different from each other;
a parameter setting step of inputting parameters originating from at least: prescription information of a user who uses the progressive addition lens pair, life environmental information of the user, and frame shape information of a frame for holding the progressive addition lens pair;
selecting a basic design distribution group from the plurality of basic design distribution groups based on the inputted parameters;
selecting a corridor length from the plurality of corridor lengths based on the inputted parameters; and
selecting a lens design standard which includes the basic design distribution group and the corridor length selected from the plurality of basic design distribution groups and the plurality of corridor length, respectively, from the lens design standard variations, wherein:
in the parameter setting step, a distance between a vertex of a rear surface of a right progressive addition lens and a vertex of a cornea of a right eye and a distance between a vertex of a rear surface of a left progressive addition lens and a vertex of a cornea of a left eye calculated based on the prescription information of the user and the frame shape information in a state where spectacles worn by the user are included into setting elements of the parameters,
at least one of the selecting the basic design distribution group, the selecting the corridor length, and the selecting the lens design standard is performed using a computing device,
the selecting the basic design distribution group comprises:
obtaining an average distance power for each of the right and left lenses based on a distance power of each of the right and left lenses, and calculating a first basic design selection point based on an average value of the average distance power of the right lens and the average distance power of the left lens;
calculating a second basic design selection point based on an addition power of each of the right and left lenses;
calculating a third basic design selection point based on a forward tilt angle of the progressive addition lens;
calculating a fourth basic design selection point based on the distance between the vertex of the rear surface of the right progressive addition lens and the vertex of the cornea of the right eye and the distance between the vertex of the rear surface of the left progressive addition lens and the vertex of the cornea of the left eye;
calculating a fifth basic design selection point based on a degree of importance of life scenes;
calculating a sixth basic design selection point based on a degree of importance of distance vision; and
calculating a seventh basic design selection point based on type information of a last-used progressive addition lens;
calculating a basic design selection point based on at least the first to seventh basic design selection points,
as the basic design distribution group, a standard basic design distribution group, a soft type basic design distribution group, and a clear type basic design distribution group are prepared, the soft type basic design distribution group having narrower distance vision area and less aberration in a lateral portion ranging from an intermediate vision area to the near vision area of the lens than the standard basic design distribution group, the clear type basic design distribution group having wider distance vision area and more aberration in the lateral portion ranging from the intermediate vision area to the near vision area of the lens than the standard basic design distribution group, and
when calculating the seventh basic design selection point, in the case where a degree of satisfaction with the last-used progressive addition lens is high, the seventh basic design selection point is selected so that a basic design distribution group leaning to the soft type is selected if the last-used progressive addition lens is a soft type, and a basic design distribution group leaning to the clear type is selected if the last-used progressive addition lens is a clear type.

10. A lens design standard selecting method to select a lens design standard from a basic design distribution group and a corridor length, the basic design distribution group determining a distribution of a distance vision area and a near vision area of a progressive addition lens pair, the method comprising:

preparing lens design standard variations that include a plurality of basic design distribution groups different from each other in area-division between the distance vision area and the near vision area, and a plurality of corridor lengths different from each other;

a parameter setting step of inputting parameters originating from at least: prescription information of a user who uses the progressive addition lens pair, life environmental information of the user, and frame shape information of a frame for holding the progressive addition lens pair;

selecting a basic design distribution group from the plurality of basic design distribution groups based on the inputted parameters;

selecting a corridor length from the plurality of corridor lengths based on the inputted parameters; and selecting a lens design standard which includes the basic design distribution group and the corridor length selected from the plurality of basic design distribution groups and the plurality of corridor length, respectively, from the lens design standard variations, wherein:

in the parameter setting step, a distance between a vertex of a rear surface of a right progressive addition lens and a vertex of a cornea of a right eye and a distance between a vertex of a rear surface of a left progressive addition lens and a vertex of a cornea of a left eye calculated based on the prescription information of the user and the frame shape information in a state where spectacles worn by the user are included into setting elements of the parameters, at least one of the selecting the basic design distribution group, the selecting the corridor length, and the selecting the lens design standard is performed using a computing device, the selecting the basic design distribution group comprises:
obtaining an average distance power for each of the right and left lenses based on a distance power of each of the right and left lenses, and calculating a first basic design selection point based on an average value of the average distance power of the right lens and the average distance power of the left lens;

calculating a second basic design selection point based on an addition power of each of the right and left lenses;

calculating a third basic design selection point based on a forward tilt angle of the progressive addition lens;

calculating a fourth basic design selection point based on the distance between the vertex of the rear surface of the right progressive addition lens and the vertex of the cornea of the right eye and the distance between the vertex of the rear surface of the left progressive addition lens and the vertex of the cornea of the left eye;

calculating a fifth basic design selection point based on a degree of importance of life scenes;

calculating a sixth basic design selection point based on a degree of importance of distance vision; and calculating a basic design selection point based on at least the first to sixth basic design selection points, as the basic design distribution group, a standard basic design distribution group, a soft type basic design distribution group, and a clear type basic design distribution group are prepared, the soft type basic design distribution group having narrower distance vision area and less aberration in a lateral portion ranging from an intermediate vision area to the near vision area of the lens than the standard basic design distribution group, the clear type basic design distribution group having wider distance vision area and more aberration in the lateral portion ranging from the intermediate vision area to the near vision area of the lens than the standard basic design distribution group, and if a last-used spectacle lens is a multifocal lens, the sixth basic design selection point is selected so that a basic design distribution group leaning to the clear type is selected.

* * * * *